US008570375B1

(12) United States Patent
Srinivasan et al.

(10) Patent No.: US 8,570,375 B1
(45) Date of Patent: Oct. 29, 2013

(54) METHOD AND APPARATUS FOR RANDOM-ACCESS REVIEW OF POINT OF SALE TRANSACTIONAL VIDEO

(75) Inventors: Vikram Srinivasan, Billerica, MA (US); Malay Kundu, Lexington, MA (US); Joshua Migdal, Wayland, MA (US); Matthew Farrow, Canton, MA (US)

(73) Assignee: Stoplift, Inc., Cambridge, MA (US)

(*) Notice: Subject to any disclaimer, the term of this patent is extended or adjusted under 35 U.S.C. 154(b) by 905 days.

(21) Appl. No.: 12/328,419

(22) Filed: Dec. 4, 2008

Related U.S. Application Data

(60) Provisional application No. 61/005,247, filed on Dec. 4, 2007.

(51) Int. Cl.
*H04N 7/18* (2006.01)
(52) U.S. Cl.
USPC ............................ 348/150; 235/383; 348/570
(58) Field of Classification Search
USPC .......................................................... 348/150
See application file for complete search history.

(56) References Cited

U.S. PATENT DOCUMENTS

| | | | |
|---|---|---|---|
| 5,745,036 A | 4/1998 | Clare | |
| 5,965,861 A * | 10/1999 | Addy et al. | 235/383 |
| 6,216,228 B1 * | 4/2001 | Chapman et al. | 713/176 |
| 7,049,965 B2 | 5/2006 | Kelliher et al. | |
| 7,080,778 B1 | 7/2006 | Kressin et al. | |
| 7,118,026 B2 | 10/2006 | Harris et al. | |
| 7,416,118 B2 | 8/2008 | Throckmorton et al. | |
| 7,516,888 B1 * | 4/2009 | Kundu et al. | 235/383 |
| 7,631,808 B2 * | 12/2009 | Kundu et al. | 235/383 |
| 2003/0052906 A1 * | 3/2003 | Lau et al. | 345/700 |
| 2005/0269405 A1 * | 12/2005 | Throckmorton et al. | 235/383 |
| 2006/0221184 A1 * | 10/2006 | Vallone et al. | 348/155 |
| 2006/0243798 A1 * | 11/2006 | Kundu et al. | 235/383 |
| 2007/0008321 A1 * | 1/2007 | Gallagher et al. | 345/473 |
| 2007/0057049 A9 * | 3/2007 | Kundu et al. | 235/383 |
| 2008/0068507 A1 * | 3/2008 | Krause et al. | 348/570 |
| 2008/0071717 A1 * | 3/2008 | Nisani et al. | 706/45 |
| 2008/0275700 A1 * | 11/2008 | Bingley et al. | 704/235 |
| 2008/0284580 A1 * | 11/2008 | Babich et al. | 340/502 |
| 2008/0313540 A1 * | 12/2008 | Dirks et al. | 715/710 |
| 2009/0086814 A1 * | 4/2009 | Leontaris et al. | 375/240.02 |

* cited by examiner

*Primary Examiner* — Hamza Algibhah
(74) *Attorney, Agent, or Firm* — Chapin IP Law, LLC

(57) ABSTRACT

The present disclosure includes a system in which a video displayer, having access to video surveillance data and point-of-sale transaction data, provides random-access review of point-of-sale transactional video. Embodiments herein provide a new method of reviewing security video of a transaction taking place at a retail establishment's point-of-sale transaction area, or register. Embodiments herein enable random and instantaneous access to any number of transaction events that may be of interest to a loss prevention investigator. In one embodiment, a video displayer obtains video data comprising a point-of-sale transaction occurring at a point-of-sale transaction area, and transaction data from a point-of-sale terminal. The video displayer displays video of individual transaction events from a larger transaction, and visually modifies displayed video at a moment in the video when a transaction event occurs.

34 Claims, 17 Drawing Sheets

1100-1

1010
OBTAIN VIDEO DATA COMPRISING A POINT-OF-SALE TRANSACTION OCCURRING AT A POINT-OF-SALE TRANSACTION AREA

1020
DISPLAY VIDEO OF A PORTION OF THE POINT-OF-SALE TRANSACTION, THE PORTION BEING LESS THAN VIDEO OF A COMPLETE DURATION OF THE POINT-OF-SALE TRANSACTION, WHEREIN THE PORTION INCLUDES AT LEAST ONE POINT-OF-SALE TRANSACTION EVENT ASSOCIATED WITH THE POINT-OF-SALE TRANSACTION

1022
DISPLAY VIDEO COMPRISING A SERIES OF VIDEO CLIPS OF POINT-OF-SALE TRANSACTIONS, WHEREIN EACH VIDEO CLIP DISPLAYED CONTAINS A POTENTIALLY SUSPICIOUS TRANSACTION EVENT

1024
FOR TRANSACTION EVENTS DISPLAYED IN THE VIDEO, VISUALLY MODIFY THE DISPLAYED VIDEO AT A MOMENT IN THE DISPLAYED VIDEO WHEN THE TRANSACTION EVENTS OCCUR IN THE TRANSACTION

1025
OVERLAY A VISUAL MODIFICATION ON ONE OR MORE FRAMES CORRESPONDING TO THE MOMENT IN THE DISPLAYED VIDEO WHEN THE AT LEAST ONE TRANSACTION EVENT OCCURS, WHEREIN A NUMBER OF FRAMES RECEIVING A VISUAL OVERLAY FOR EACH TRANSACTION EVENT IS DETERMINED BASED ON CREATING A VISUAL MODIFICATION OF SUFFICIENT DURATION IN DISPLAYED VIDEO TO SIGNAL TO A REVIEWER THAT A TRANSACTION EVENT OCCURRED

1026
FOR POINT-OF-SALE TRANSACTION EVENTS IDENTIFIED BY OBJECT RECOGNITION LOGIC, VISUALLY MODIFY THE DISPLAYED VIDEO AT A MOMENT IN THE DISPLAYED VIDEO WHEN THE POINT-OF-SALE TRANSACTION EVENTS, IDENTIFIED BY THE OBJECT RECOGNITION LOGIC, OCCUR IN THE POINT-OF-SALE TRANSACTION. FOR POINT-OF-SALE TRANSACTION EVENTS RECORDED THROUGH THE POINT-OF-SALE TRANSACTION TERMINAL, VISUALLY MODIFY THE DISPLAYED VIDEO AT A MOMENT IN THE DISPLAYED VIDEO WHEN THE POINT-OF-SALE TRANSACTION EVENTS, RECORDED THROUGH THE POINT-OF-SALE TRANSACTION TERMINAL, OCCUR IN THE POINT-OF-SALE TRANSACTION.

FIG. 11

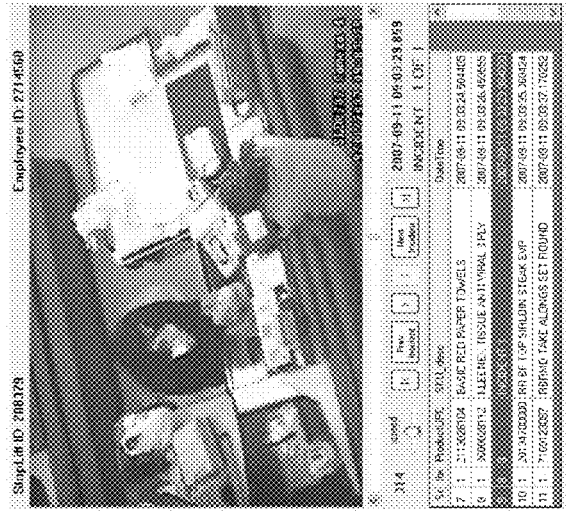
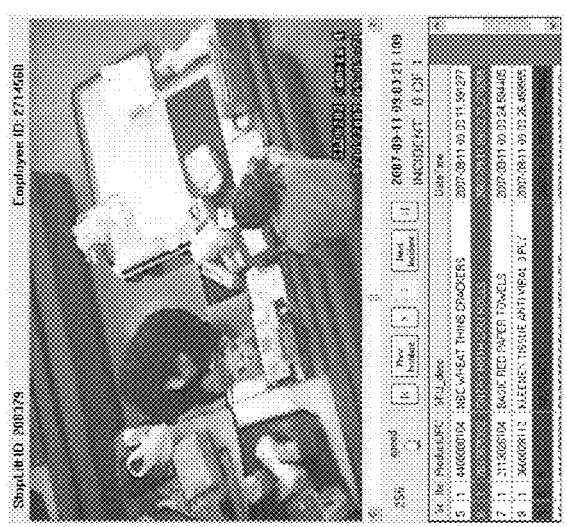
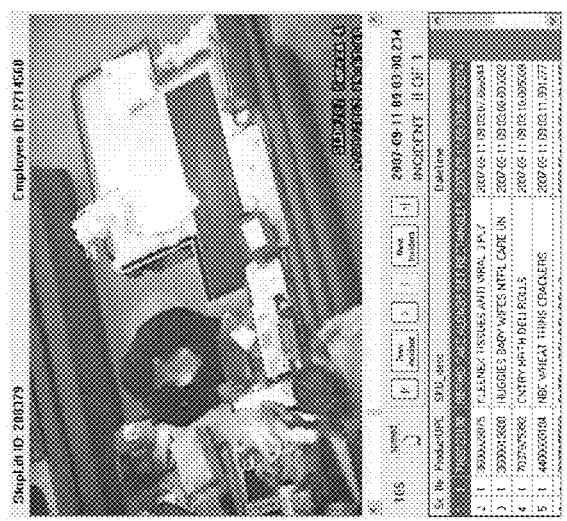
FIG. 15

| Date | Reg | Stoplift # | Cashier | Total Extra Items for Cashier | Retailer Trans # | Type | # of Items | Report Link | Description of Item | Est Amount | Comments |
|---|---|---|---|---|---|---|---|---|---|---|---|
| 9/1/2007 | 3 | 184654 | 2478859 | 15 | 7954213902005 | Avoided scan | 1 | Trans 184654 | Cling Wrap | 3.79 | |
| 9/1/2007 | 8 | 185921 | 2478859 | 15 | 7954213903432 | Avoided scan | 1 | Trans 185921 | Empty plastic bag | 0.00 | |
| 9/1/2007 | 5 | 185012 | 2559353 | 17 | 7954213903606 | Missed scan was not reattempted | 1 | Trans 185012 | DD Sl Cheese | 4.29 | |
| 9/1/2007 | 5 | 185044 | 2719677 | 58 | 7954213903764 | Missed scan was not reattempted | 4 | Trans 185044 | 4 blue bags | 0.00 | Questions customer |
| 9/1/2007 | 6 | 185556 | 9422681 | 34 | 7954213907388 | Missed scan was not reattempted | 1 | Trans 185556 | Brogures Milk | 5.29 | Talking to C.C. |
| 9/1/2007 | 7 | 185742 | 9422681 | 34 | 7954213903823 | Missed scan was not reattempted | 1 | Trans 185742 | Produce item | 3.25 | |
| 9/1/2007 | 3 | 186547 | 9434634 | 9 | 7954213902913 | Avoided scan | 1 | Trans 186547 | Feather duster, lotte | 0.00 | Asks for price check, enters in R |
| 9/4/2007 | 6 | 186437 | 2414189 | 11 | 7957213907023 | Avoided scan | 1 | Trans 186437 | Exchanged item | 0.00 | |
| 9/4/2007 | 6 | 186471 | 2414189 | 11 | 7957213907159 | Avoided scan | 1 | Trans 186471 | Party Ice | 3.99 | |
| 9/4/2007 | 1 | 187490 | 2601253 | 5 | 7957213903635 | Avoided scan | 1 | Trans 187490 | Unknown | | |
| 9/4/2007 | 7 | 186866 | 3536742 | 14 | 7957213902556 | Missed scan & abandoned sca | 1 | Trans 186866 | Diet Coke 12pk | 7.09 | Talking to customer |
| 9/4/2007 | 5 | 186479 | 2719677 | 58 | 7957213900545 | Reattempted sinc abandoned sca | 1 | Trans 186479 | Sky Trash bags | 5.99 | |
| 9/4/2007 | 7 | 186830 | 2719677 | 58 | 7957213904439 | Missed scan was not reattempted | 1 | Trans 186830 | Tortillas | 2.89 | |
| 9/4/2007 | 7 | 186833 | 2719677 | 58 | 7957213904469 | Missed scan was not reattempted | 1 | Trans 186833 | Bananas | 1.58 | |
| 9/4/2007 | 7 | 186885 | 2719677 | 58 | 7957213904638 | Missed scan was not reattempted | 1 | Trans 186885 | Exchanged item | 0.00 | |
| 9/4/2007 | 8 | 188004 | 9434634 | 9 | 7957213905949 | Avoided scan | 1 | Trans 188004 | Rx Bag | 0.00 | |
| 9/4/2007 | 1 | 190278 | 2349558 | 25 | 7957213904156 | Missed scan was not reattempted | 1 | Trans 190278 | Squash | 0.00 | entered |
| 9/5/2007 | 2 | 190049 | 3053467 | 13 | 7958213905139 | Avoided scan & Missed scan wa | 1 | Trans 190049 | Case water | 6.89 | |
| 9/5/2007 | 5 | 191227 | 3053467 | 13 | 7958213902130 | Avoided scan | 5 | Trans 191227 | cling wrap, thbrsh, | 36.48 | This is not the correct checker |
| 9/5/2007 | 4 | 190863 | 2719677 | 58 | 7958213904633 | Avoided scan | 2 | Trans 190863 | Hnydew and Straw | 5.48 | |
| 9/5/2007 | 4 | 191153 | 2719677 | 58 | 7958213904543 | Missed scan was not reattempted | 1 | Trans 191153 | Produce/tomatoes | 4.00 | |
| 9/5/2007 | 4 | 191197 | 2719677 | 58 | 7958213904575 | Missed scan was not reattempted | 1 | Trans 191197 | Oranges | 4.00 | |
| 9/5/2007 | 6 | 191540 | 2719677 | 58 | 7958213901256 | Missed scan was not reattempted | 1 | Trans 191540 | Qkr granola bars | 3.00 | |
| 9/5/2007 | 6 | 191567 | 2719677 | 58 | 7958213901898 | Missed scan was not reattempted | 1 | Trans 191567 | Bananas | 2.00 | |
| 9/5/2007 | 3 | 190006 | 2740794 | 11 | 7958213905179 | Missed scan was not reattempted | 1 | Trans 190006 | Arrowhead 3 pk | 3.35 | |
| 9/5/2007 | 3 | 190725 | 6466875 | 14 | 7958213901142 | Missed scan was not reattempted | 1 | Trans 190725 | Lucerne Yogurt | 0.80 | |
| 9/5/2007 | 1 | 190159 | 9423681 | 34 | 7958213903634 | Avoided scan | 1 | Trans 190159 | 2 pkgs grapes | 0.00 | Enters in dept sales |

*FIG. 17*

METHOD AND APPARATUS FOR RANDOM-ACCESS REVIEW OF POINT OF SALE TRANSACTIONAL VIDEO

CROSS-REFERENCE TO RELATED APPLICATIONS

This Utility Patent Application claims the benefit of the filing date of the following earlier filed U.S. Provisional Patent Application: "METHOD AND APPARATUS FOR RANDOM-ACCESS REVIEW OF POINT OF SALE TRANSACTIONAL VIDEO" filed Dec. 4, 2007 having U.S. Ser. No. 61/005,247. The content and teachings of the above provisional application are hereby incorporated by reference in their entirety.

BACKGROUND

Retail establishments commonly use point of sale terminals or other transaction terminals, such as cash registers, to allow customers of those establishments to purchase items. As an example, in a conventional department store, supermarket or other retail establishment, a customer collects items for purchase throughout the store and places them in a shopping cart or basket, or simply carries the items to a point of sale terminal to purchase those items in a transaction.

The point of sale terminal may be staffed with an operator such as a cashier who is a person employed by the store to assist the customer in completing the transaction. In some cases, retail establishments have implemented self-checkout point of sale terminals in which the customer is the operator. In either case, the operator typically places items for purchase on a counter, conveyor belt or other item input area. The point of sale terminals include a scanning device such as a laser or optical scanner device that operates to identify a Uniform Product Code (UPC) label or bar code affixed to each item that the customer desires to purchase. The laser scanner is usually a peripheral device coupled to a computer that is part of the point-of-sale (POS) terminal.

To scan an item, the operator picks up each item, one by one, from the item input area and passes each item over a scanning area such as glass window built into the counter or checkout area to allow the laser scanner to detect the UPC code. Once the point of sale computer identifies the UPC code on an item, the computer can perform a lookup in a database to determine the price and identity of the scanned item. Alternatively, in every case where the operator can scan the item, the operator may likewise enter the UPC or product identification code into the terminal manually or through an automatic product identification device such as an RFID reader. The term "scan" is defined generally to include all means of entering transaction items into a transaction terminal. Likewise, the term "scanner" is defined generally as any transaction terminal, automated and/or manual, for recording transaction information.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. Once all items in the transaction are scanned in this manner, the operator indicates to the point of sale terminal that the scanning process is complete and the point of sale terminal displays a total purchase price to the customer who then pays the store for the items purchased in that transaction.

In addition to recording transactions through point of sale terminals, retailer establishments also commonly use video surveillance to record point of sale activity. Overhead video security cameras record operator behavior near the point of sale terminal. Such video security cameras generally operate on a closed circuit network that is separate from the point of sale terminal network.

Video surveillance of point of sale transaction activity is useful for quality control such as with unintentional failed scans, and to prevent and identify fraud in point of sale transactions, such as intentionally failed scans. Some conventional systems include human monitoring systems and video monitoring systems that involve the use of loss prevention personnel overseeing a real-time video feed (or pre-recorded) to identify fraudulent transactions. There also exist automated systems that attempt to identify questionable transactions based on a graphical analysis of video surveillance data.

SUMMARY

Video surveillance of point-of-sale transactions suffers from a variety of deficiencies. By recording an operator's behavior, security personnel can review video to determine whether or not the operator is failing to scan items brought to a point-of-sale terminal. Such an approach, however, is burdensome because security personnel are forced to search through every frame of video in order to find instances when the operator failed to scan items left in shopping carts. This approach is time intensive and requires that security personnel be highly alert when reviewing a multitude of somewhat repetitive and similar video images.

Techniques discussed herein significantly overcome the deficiencies of conventional video surveillance review systems. For example, as will be discussed further, certain specific embodiments herein are directed to a computer and/or network environment in which a video displayer, having access to video surveillance data and point-of-sale transaction data, provides random-access review of point-of-sale transactional video. Embodiments herein provide a new method of reviewing security video of a transaction taking place at a retail establishment's point-of-sale transaction area, or register. Embodiments herein enable random and instantaneous access to any number of transaction events that may be of interest to a loss prevention investigator.

More specifically, according to one embodiment, a video displayer obtains video data comprising a point-of-sale transaction occurring at a point-of-sale transaction area. The video data can be obtained, for example, from overhead video surveillance cameras located in a retail area where items are purchased. The video data includes transaction events. Such events include, but are not limited to, item scans, weighed items, cash door openings, cashier login, and transfer of items to and from a shopping cart.

The video displayer also obtains transaction data concerning the point-of-sale transaction occurring at the point-of-sale transaction area. This transaction data corresponds to transaction events recorded through a point-of-sale transaction terminal. The point-of-sale transaction terminal is any device or system, such as a cash register, used to complete a point-of-sale transaction. The transaction data recorded through the point-of-sale transaction terminal includes any data recordable through the point-of-sale transaction terminal. For instance, such data can include item scans, weighed items, item returns, cash register openings, cashier login, start of transaction, and end of transaction.

The video displayer correlates the video data with the transaction data. It is common for retailers to operate point-of-sale transaction terminals on one networked system, while operating video surveillance cameras on a second networked system that is at least partially separated from the point-of-sale transaction terminals. The video displayer then displays video, from the video data, containing transaction events.

The video displayer can also display an event list. The event list displays transaction events from the video data. Each listed transaction event can be a transaction event recorded through the point-of-sale terminal, a transaction event identified by a video analysis process, a combination of the two sources, or other inputs. When the video displayer receives a selection of a transaction event listed in the event list, the video displayer displays a portion of video from the point-of-sale transaction that corresponds to the selected transaction event in the list. This means that if a particular transaction included 50 transaction events listed in the event list, a reviewer could select one particular transaction event in the event list, and immediately view video associated with the selected transaction event. Such a feature is beneficial to increasing efficiency in reviewing point-of-sale transactions.

The video displayer can also modify video data. For one or more transaction events displayed in the video, the video displayer visually modifies the displayed video at a moment in the displayed video when the transaction events occur in the point-of-sale transaction. Such a visual modification, at the moment when a transaction event occurs, visually signals to the reviewer that the transaction event occurred. This means that there is no context switch between reviewing video and monitoring an event list. There exist video display systems that display a scrolling events list on or near video surveillance footage. Reviewing video in such systems is time-consuming, inefficient, and error prone. The reviewer is required to simultaneously monitor human actions while referencing an event list. This means a reviewer's eyes move back and forth between video data and an event list in an attempt to confirm transaction events. Such long scrolling text can be confusing. Because the video displayer, of the present disclosure, visually modifies the video data at a moment a transaction event occurs, the video reviewer can keep eyes on activity in the point-of-sale transaction video, and recognize that the transaction event occurred without having to remove eyes from the transaction activity.

In another embodiment, the video displayer obtains video data comprising a point-of-sale transaction occurring at a point-of-sale transaction area. The video displayer analyzes the video data according to object recognition logic that identifies transaction activity associated with the point-of-sale transaction. The object recognition logic can include a graphical analysis process for identifying activity at a point-of-sale transaction terminal. By way of a non-limiting example, such an object recognition process and logic identifies when items 307 physically move over a scanning area, sizes of items, and quantity of items.

The video displayer identifies transaction data associated with the point-of-sale transaction and reported through a point-of-sale transaction terminal in the transaction area. The transaction data corresponds to transaction events. The video displayer compares the video data to the transaction data to identify potentially suspicious activity. The video displayer can use any number of rules that dictate when to identify transaction activity as potentially suspicious. By way of a non-limiting example, one rule is that transaction activity is identified as potentially suspicious when items are recognized through the video analysis process as being passed over a scanner while the point-of-sale transaction terminal did not record a scan. Potentially suspicious activity can include unscanned items—whether intentional or unintentional—refunds with out a customer, item counts that do not match register data, or any other and unwanted activity.

The video displayer displays video of a portion of the point-of-sale transaction. This portion is less than video of a complete duration of the point-of-sale transaction, and this portion includes a least one transaction event identified as potentially suspicious activity. By way of a non-limiting example, a particular point-of-sale transaction includes 100 transaction events, with only one transaction event marked as potentially suspicious. The video displayer then displays a video clip of the potentially suspicious transaction event, and, optionally, one or more legitimate transaction events occurring before and/or after the potentially suspicious transaction event. By displaying a portion of the point-of-sale transaction, instead of displaying complete duration of the point-of-sale transaction, a reviewer can efficiently confirm or reject potentially suspicious activity, and determine whether an entire point-of-sale transaction is suspicious by only reviewing a portion of the point-of-sale transaction.

In further embodiments, the video displayer obtains video data comprising a point-of-sale transaction occurring at a point-of-sale transaction area. The video displayer displays video of a portion of the point-of-sale transaction. The portion being less than video of a complete duration of the point-of-sale transaction. The portion includes at least one point-of-sale transaction event associated with the point-of-sale transaction. Displaying such portions can include displaying a series of video clips of point-of-sale transactions each containing a potentially suspicious transaction event. The video displayer can also visually modify the displayed video at a moment in the display video when transaction events occur in the transaction, which transaction events can include legitimate transaction events and or transaction events identified as potentially suspicious.

The video displayer receives an indication of whether a displayed a point-of-sale transaction event is suspicious. From such an indication, the video displayer can mark point-of-sale transactions as suspicious. Such indications can be received from a reviewer that potentially suspicious point-of-sale transaction events are suspicious. The video displayer can also provide a transaction event navigation control that enables a video reviewer to advance video to a next transaction event in a series of transaction events identified as suspicious.

In addition to the example method, system, etc., embodiments as discussed above, and other embodiments herein, can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a video displayer and/or related functions as explained herein to carry out different embodiments as described herein.

Yet other embodiments herein include software programs to perform the steps and operations summarized above and disclosed in detail below. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting video displayer operations such as described above. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by StopLift, Inc. of Bedford, Mass.

As discussed above, techniques herein are well suited for use in software applications supporting automated vision systems such as used with purchase transactions. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 4-12 are flowcharts illustrating examples of a video display process according to embodiments herein.

FIG. 15 is an example graphical user interface illustrating video display of suspicious transaction activity according to embodiments herein.

FIG. 17 is an example graphical user interface illustrating a transaction event navigation list with program links according to embodiments herein.

DETAILED DESCRIPTION

According to one example embodiment, a video displayer provides random-access of review point-of-sale transaction video. Via a graphical user interface, a video reviewer can efficiently review a portion of a point-of-sale transaction to identify whether an entire transaction is suspicious or fraudulent. The video displayer can also provide a visual modification of video data associated with a transaction at the moment when a transaction event occurs.

Figure 1:
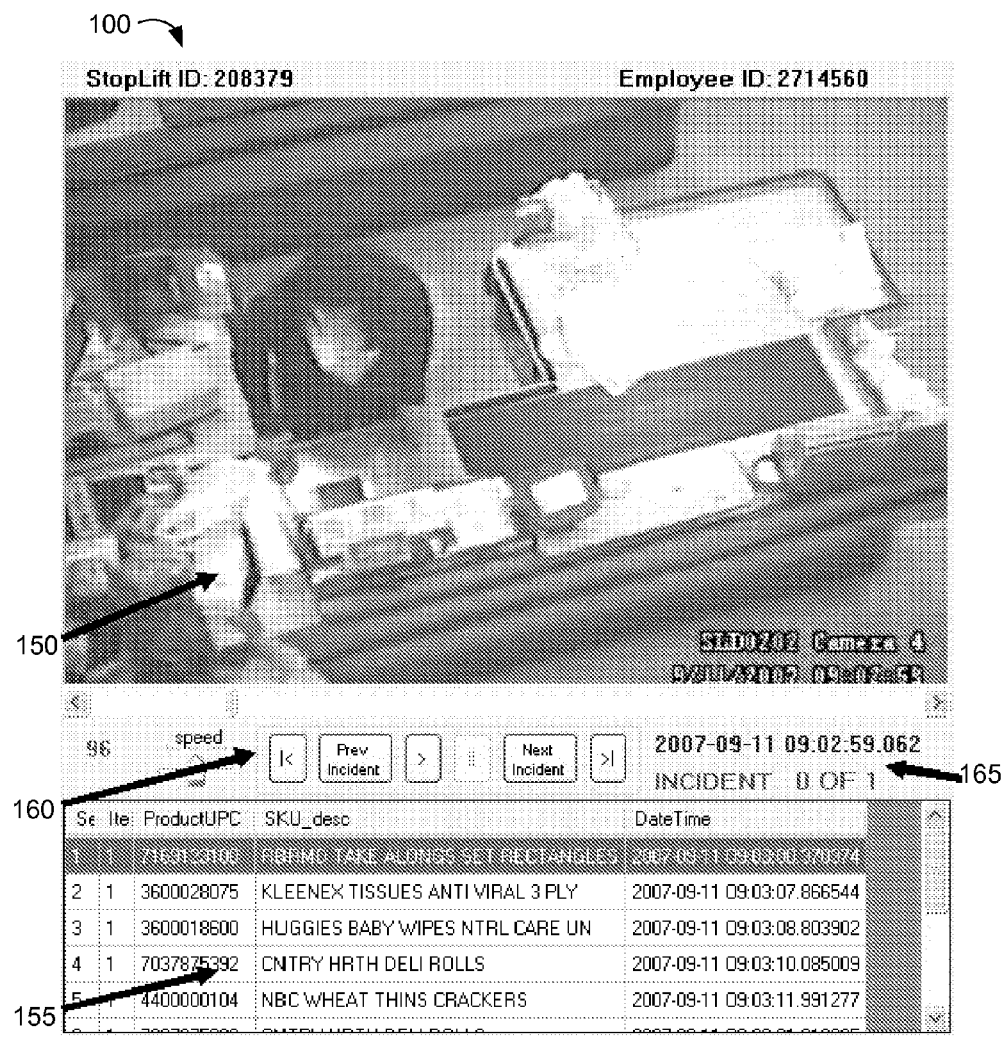
FIG. 1 is an example graphical user interface of a video displayer for displaying transaction events according to embodiments herein.

FIG. 1 is an example graphical user interface illustrating heads up display 100 displaying transaction events according to embodiments herein. The heads-up display 100 includes viewport 150 for displaying video data, event list 155 for displaying transaction events, event navigation controls 160 for accessing video clips among a list of transaction events, and video positional information 165, which can show date, time, and video clip identification. The video positional information 165 dialog shows statistics relevant to the video currently displayed. Such information includes millisecond-accurate timestamps of the video as well as a tally of the suspicious-type transaction events that have been reviewed at a current point in the video.

The viewport 150 is used primarily to view video from a retail establishment's cameras. The decision of what video is reviewed is dictated by other controls and by a reviewers's interaction with the controls. The viewport 150 integrates heads-up display technology to display pertinent information about a transaction during the process of reviewing the video.

Figure 2:
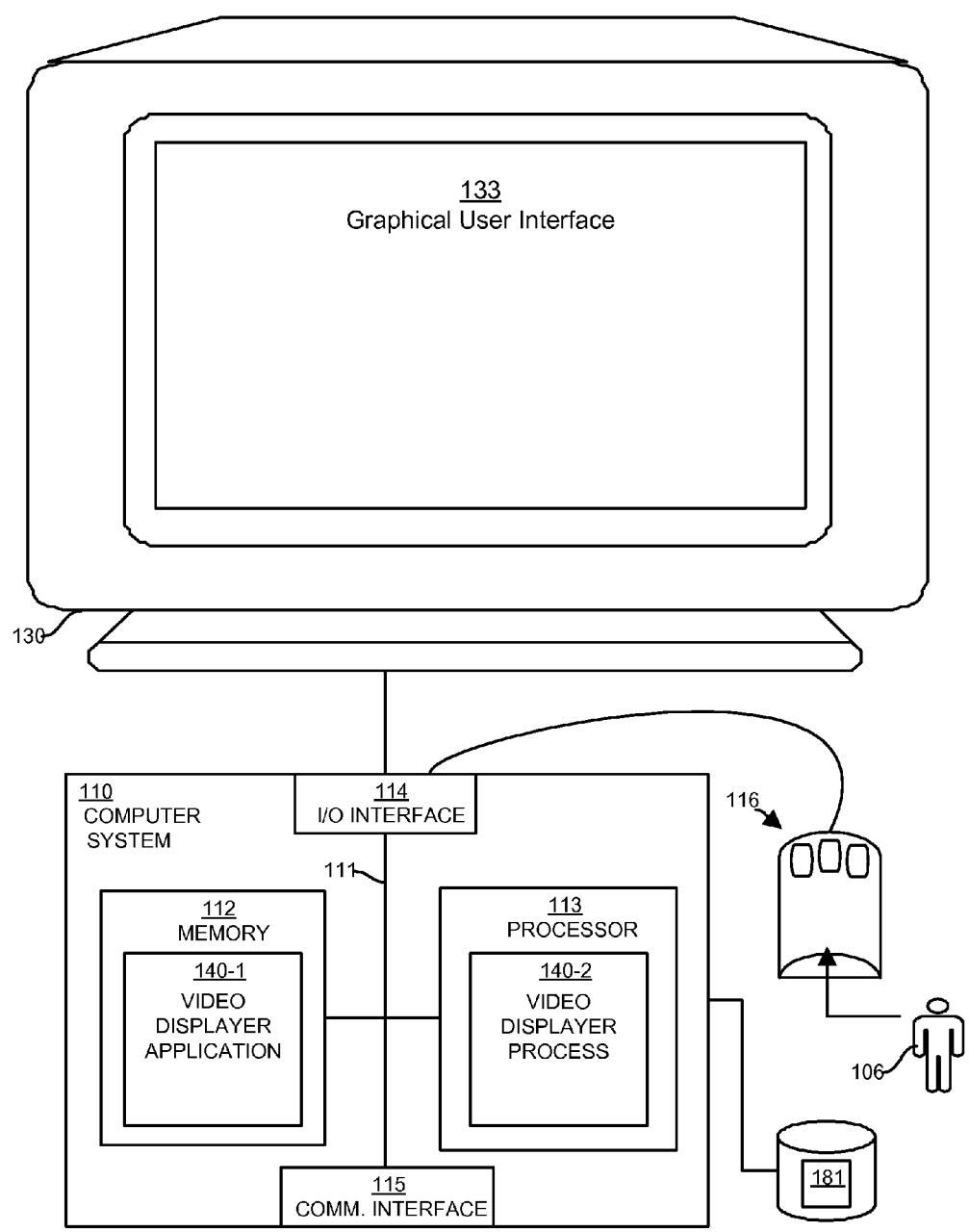
FIG. 2 is a block diagram illustrating an example architecture of a computer system in a computer/network environment according to embodiments herein.

FIG. 2 is a block diagram illustrating an example architecture of a computer system in a computer/network environment according to embodiments herein. FIG. 2 includes, generally, graphical user interface 133 for displaying heads-up display 100. Video displayer application 140-1 in video displayer process 140-2 comprises video displayer 140. FIG. 2 will be explained in more detail in a subsequent section of this disclosure.

Figure 3:
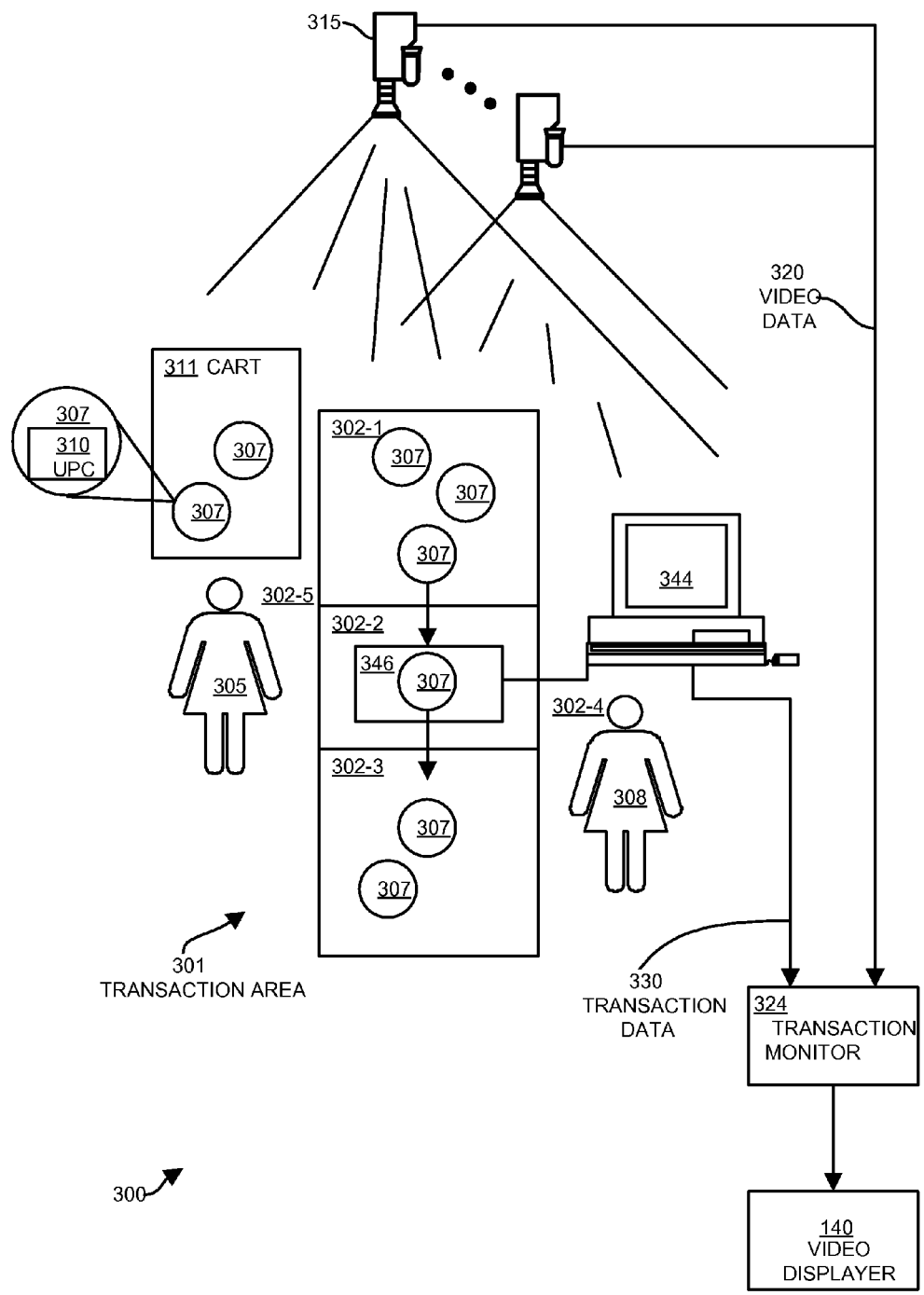
FIG. 3 is illustrates an example configuration of a network environment that includes a video surveillance system and computer system configured with a transaction monitor configured as disclosed herein.

FIG. 3 is an illustration of an example environment 300 suitable for use in explaining example embodiments disclosed herein. Example environment 300 depicts a retail establishment in which customers 305 can purchase items 307. A transaction terminal 344 such as a point-of-sale terminal or cash register is under control of an operator 308 such as a store employee to allow the customer 305 to purchase the items 307. The transaction terminal 344 includes a scanning device 346 that is able to detect and scan or otherwise read item identities 310, such as UPC barcode symbols or RFID tags affixed to each item 307 when those items 307 are brought within a predetermined proximity of the scanner device 346.

In a typical operation of the environment 300, the customer 305 approaches the transaction area 301 with a set of items 307 to be purchased. The items 307 may be contained, for example, with a shopping cart 311 or other item carrier transported by the customer 305 to the transaction area 301. Alternatively, the customer 305 may carry the individual items 307 to the transaction area 301. To make the purchase of the items 307, the customer 305 removes the items 307 from shopping cart 311 (or from their hands if carrying the items) and places the items into an item input region generally designated as region 302-1 within the transaction area 301. The item input region 302-1 may be a conveyor belt, countertop or other surface area onto which items to be purchased are placed prior to being detected and read by the scanner device 346 of the transaction terminal 344.

The operator 308 such as a store employee interacts with the transaction terminal 344 by logging in or otherwise activating the transaction terminal 344. This process may involve the operator 308 providing a unique operator identity to the transaction terminal 344. During operation of the transaction terminal 344 by the operator 308, the body of the operator 308 generally remains within an operator region 302-4 of the transaction area 301. Once logged in, the operator 308 can begin selecting items for purchase 307 within the item input region 302-1, such as by picking up the individual items 307 by hand. The operator 308 passes each item 307 from the item input region 302-1 over the scanner device 346 generally located within an item read region 302-2. Assuming proper (i.e., non-fraudulent and non-error) operator operation, the operator 308 positions the item 307 such that the item identities 310 affixed to the item can be detected and scanned or read by the scanner device 346. In response to the scanner device 346 detecting an item identity 310 of the item 307 just scanned, the transaction terminal 344 register has the item 307 as an item to be purchased and usually produces a notification to the operator 308 such as a beeping noise or tone to indicate that the item 307 has been successfully identified. In response to the notification, the operator 308 moves the item 307 into the item output region 302-3 which may be another countertop, downstream conveyor belt or the like that holds items 307 that have been successfully scanned or read by or entered into the transaction terminal 344.

The operator 308 repeats this process for each individual item 307 such that all items 307 to be purchased are moved from the item input region 302-1, over or through the item read region 302-2 (during which scanning of the item takes place) and into the item output region 302-3. In some cases, items 307 may not contain an affixed item identity 310 such as fruit, vegetables or the like. In such cases, after removal of the item 307 from the item input region 302-1, the operator 308 manually enters the item identity into the transaction terminal 304 a keyboard or other manual input device to allow the transaction terminal 344 to register the item 307. In this manner, after all items 307 have been identified to the transaction terminal 344, the operator 308 can indicate to the transaction terminal 344 that the transaction is complete and the transaction terminal 344 calculates the total price of the items 307 to be purchased. The customer 305 then provides payment in that amount to the operator 308 and proceeds to remove the items 307 from the item output region 302-3 for transport out of the retail establishment.

The environment 300 further includes a transaction monitor 324 configured in accordance with embodiments of the invention to detect suspicious activity related to a transaction. The environment 300 also includes a video source 315 such as one or more overhead video cameras that capture video of the transaction area 301. Typically, the video source 315 is mounted in an elevated position sufficiently above the transaction area 301 to cover and capture video from the various regions 302. The transaction monitor 324 in this example receives, as input, video data 320 from the video source 315 as well as transaction data 330 from the transaction terminal 344. While the example environment 300 illustrates the transaction monitor 324 as receiving a transaction data 330 and video data 320 directly from the video source 315 and the transaction terminal 344, is to be understood that the transaction monitor 324 may receive these inputs and either real-time or any later time after processing of items or entire transactions by operator 308 is complete. Additionally, it is not required that the transaction monitor 324 receive the transaction data 330 and video data 320 directly from the video source 315 and transaction terminal 344. In an alternative configuration, these inputs can be received from a videotape machine (or from digital recorded media) or from the transaction database maintained by another computer system besides the transaction terminal 344. The video source 315 may thus be a real-time source such as a camera, or a delayed source such as a recording device such as a VCR or DVR. The transaction terminal 344 likewise may provide real-time transaction data directly from a POS (e.g., cashier terminal or scanner) or the transaction data may be delayed data from a transaction log database in which POS data is stored.

Example embodiments of the video displayer 140 explained using flowcharts from FIGS. 4-12, and with reference to the remaining figures. For purposes of the following discussion, the video displayer 140 or other appropriate entity performs steps in the flowcharts. Note that the steps in the below flowcharts need not always be executed in the order shown.

Figure 4:
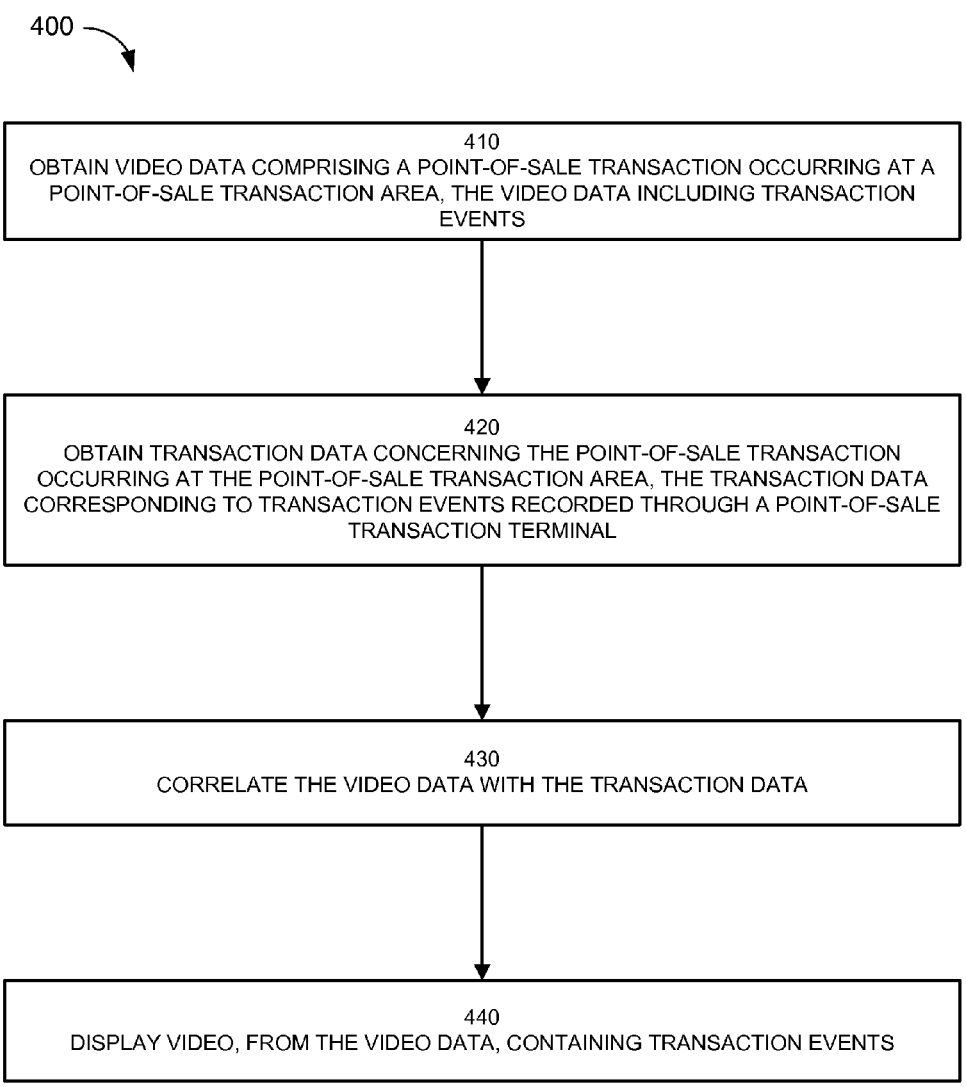

FIG. 4 is an example flowchart 400 illustrating operations associated with video displayer 140 according to embodiments herein.

In step 410, video displayer 140 obtains video data 320 comprising a point-of-sale transaction occurring at a point-of-sale transaction area 301, the video data 320 including transaction events. By way of a non-limiting example, such transaction events include: item scans, weighed items, cash drawer openings, multiple scans/reattempted scans, faked scans, avoided scans, etc.

In step 420, video displayer 140 obtains transaction data 330 concerning the point-of-sale transaction occurring at the point-of-sale transaction area 301. The transaction data 330 corresponds to transaction events recorded through the point-of-sale transaction terminal 344.

In step 430, video displayer 140 correlates the video data 320 with the transaction data 330. Video displayer 140 can correlate the data in real-time, or on a delayed basis. For example, video displayer 140 accesses synchronized transaction log information recorded through point-of-sale transaction terminal 344, and also accesses video of point-of-sale activity to correlate the video data 320 with the transaction data 330. The synchronized transaction log can include millisecond accurate or better information.

In step 440 the video displayer 140 displays video, from the video data 320, containing transaction events. Such display can be automated, or in response to reviewer interaction.

Figure 5:
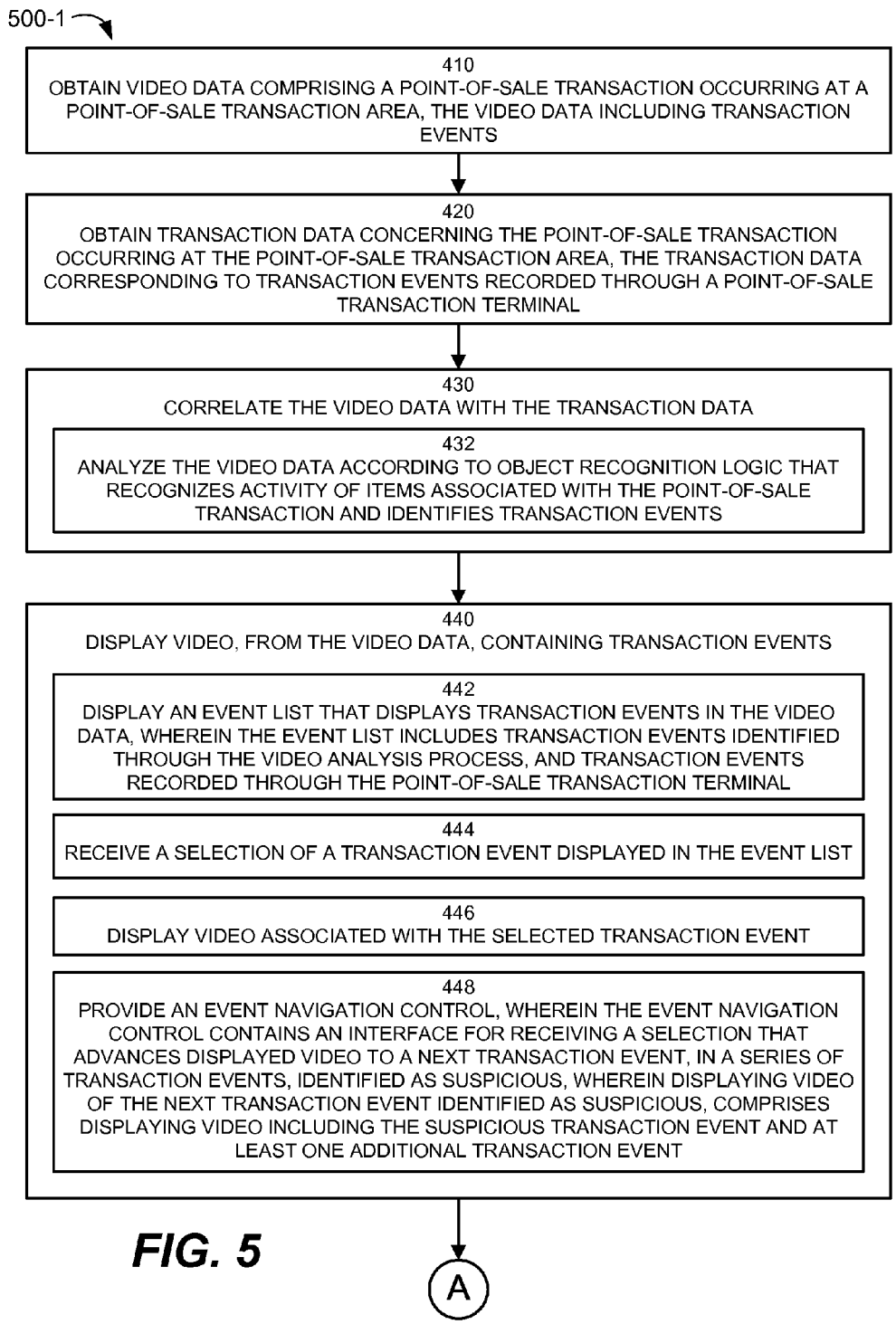
Figure 6:
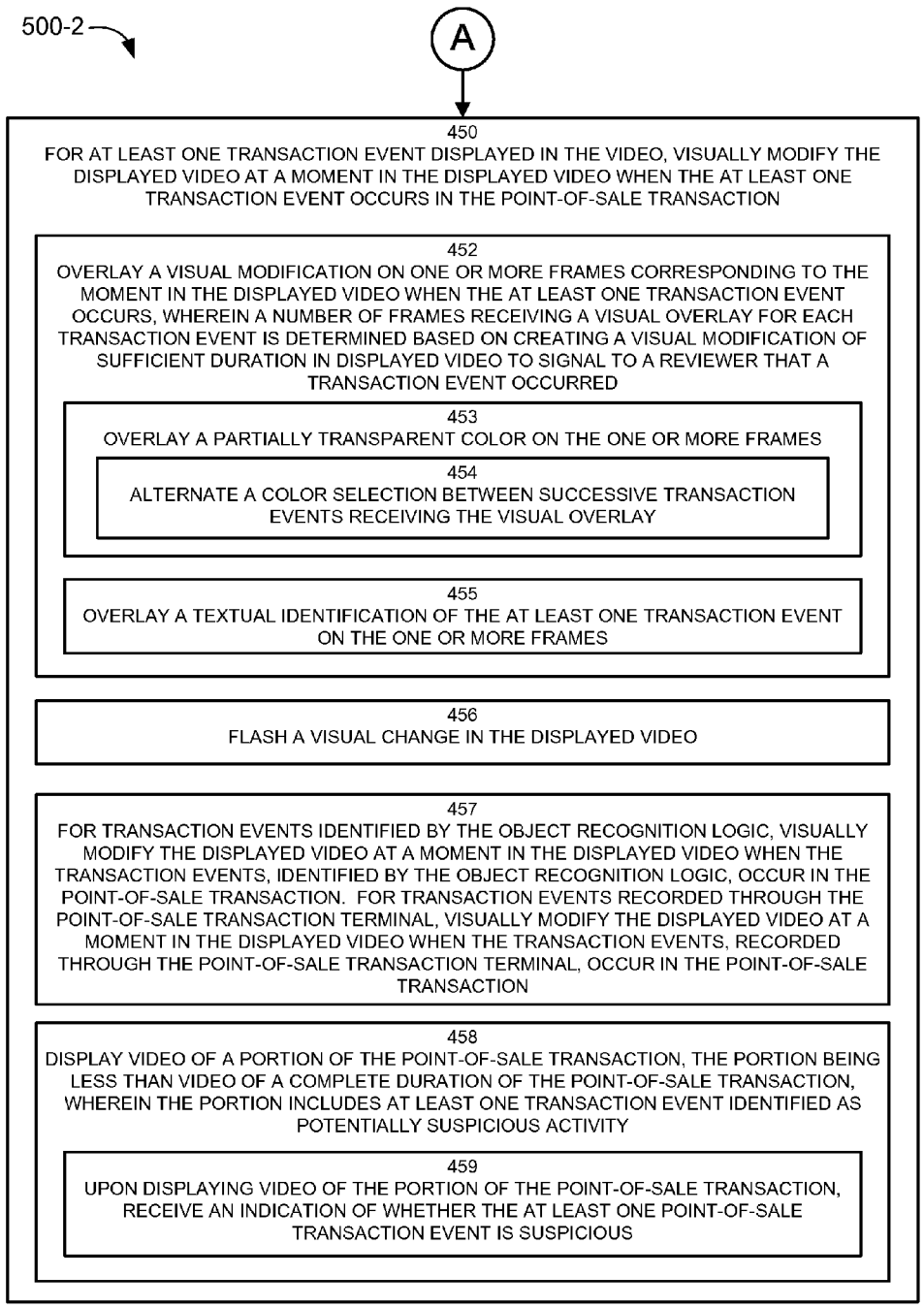

FIGS. 5-6 contain an example flowchart 500 illustrating operations associated with video displayer 140 according to embodiments herein.

In step 410, the video displayer 140 obtains video data 320 comprising a point-of-sale transaction occurring at a point-of-sale transaction area 301, the video data 330 including transaction events.

In step 420, the video displayer 140 obtains transaction data 330 concerning the point-of-sale transaction occurring at the point-of-sale transaction area 301, the transaction data corresponding to transaction events recorded through a point-of-sale transaction terminal 344.

In step 430, video displayer 140 correlates the video data 320 with the transaction data 330. In step 432, the video displayer 140 analyzes the video data 320 according to object recognition logic that recognizes activity of items 307 associated with the point-of-sale transaction and identifies transaction events. Such object recognition logic includes, by way of example, any graphical analysis process for identifying objects moving in a video. Exemplary object recognition logic that can be used is described in U.S. patent application Ser. No. 11/393,370, titled: "Method And Apparatus For Detecting Suspicious Activity Using Video Analysis."

Alternatively, video displayer 140 receives activity data, indicating activity of items associated with the point-of-sale transaction, based on a visual analysis of the video data. In such an alternative, an investigator could manually review video data and input or identify activity data or transaction activity and input such activity to video displayer 140.

In step 440, the video displayer 140 displays video, from the video data 320, containing transaction events. In step 442, the video displayer 140 displays an event list 155 that displays transaction events in the video data 330, wherein the event list includes transaction events identified through the video analysis process, and transaction events recorded through the point-of-sale transaction terminal 344.

The event list 155 operates in conjunction with the viewport 150 to display pertinent information about a transaction to an investigator or video reviewer. The event list 155 shows all of the transaction events related to a transaction and can be sorted by event time, type, or by any other feature characteristic of the events in the list.

Figure 14:
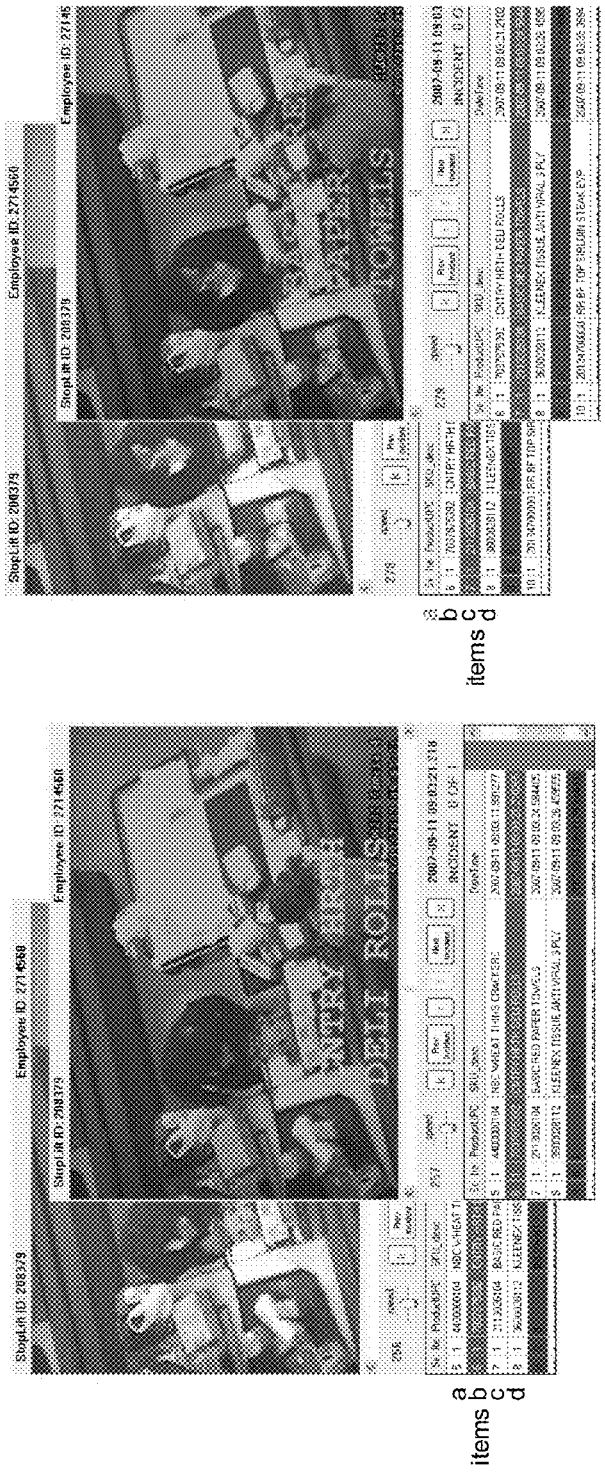
FIG. 14 is an example graphical user interface illustrating autoscrolling functionality of an event list according to embodiments herein.

When sorted by time, however, a feature of the event list 155 is that it has a timeline autoscroll capability, in which a selected transaction event progresses with progression of displayed video. FIG. 14 shows an example of such progression. As the video plays, a currently selected transaction event within the event list 155 is updated so that a highlighted transaction event is always in sync with what is currently being viewed in the viewport 150. For example, in video 1405, line "b" is highlighted in blue while showing video of a transaction event associated with an item scan for "CNTRY HRTH DELI ROLLS." In video 1410, line "c" is now highlighted in blue while viewport 150 displays a transaction event ("Basic Red Paper Towels") associated with this line. In this example, the second line in the event list 155 highlights a currently played transaction event while transaction events automatically scroll through the event list.

Furthermore, the position of video playing within the viewport 150 is linked with the event list 155. This link allows the investigator to immediately jump to a position within the video associated with any of the transaction events in the event list 155 by selecting one of the transaction events. FIG. 4 shows video frames illustrating how the video is repositioned to display each transaction event as they are selected in the event list.

Transaction events in the event list 155 can be color-coded to differentiate various types of transaction events. Normal transaction events, such as scans, are displayed using traditional font color, facing, and background color. Suspicious transaction events can be displayed differently. In FIG. 15, for instance, video 1505 shows a first line of event list 155 highlighted in blue indicated a currently displayed transaction event. Video 1510 shows a the second line in the event list 155 highlighted in blue, while showing the fifth line in the event list 155 highlighted in red indicating an incident such as a suspicious transaction event, or potentially suspicious transaction event. Video 1515 shows the third line highlighted in blue indicating that currently displayed video includes "Incident 1" which is an unscanned item. Other events, such as start-of-transaction events, may be highlighted in green. Along with the various ways of presenting heads-up display visual overlays to the investigator described previously, the ability to color code the event list facilitates the task of reviewing video.

In step 444, video displayer 140 receives a selection of a transaction event displayed in the event list. Such a selection can come from various sources including automated review logic, or a human reviewer/investigator. The event can be any event listed such as transaction events listed described above and including incidents of potentially suspicious activity.

In step 446, video displayer 140 displays video associated with the selected transaction event. In other words, video displayer 140 initiates playback of a video clip in viewport 150, where the video clip, for example, shows activity at a point-of-sale terminal corresponding to the selected transaction event. If the transaction event selected was identified as a scan of tortillas, the displayed video would show video of tortillas moving across a point-of-sale scanner, and optionally one or more separate transaction events before and/or after the scan of tortillas. If the selected transaction event was identified as an incident or potentially suspicious scan, then the displayed video shows at least the potentially suspicious transaction event.

In step 448, video displayer 140 provides an event navigation control. The event navigation control contains an interface for receiving a selection that advances displayed video to a next transaction event, in a series of transaction events, identified as suspicious. By way of a non-limiting example, the event navigation control contains buttons to select "Previous Incident" or "Next Incident." Displaying video of the next transaction event identified as suspicious, comprises displaying video including the suspicious transaction event and at least one additional transaction event. Displaying at least one additional transaction event, especially a legitimate transaction event, is beneficial to provide a reference event for comparison and to put the suspicious transaction event in context.

FIG. 15 shows an example of this. Video frame 1505 shows a normal scan with accompanying visual modification, such as changing the screen to a partially transparent green color. Video frame 1510 also shows a normal scan with an accompanying visual modification. Video frame 1515 shows a suspicious transaction event (an unscanned item) and no visual modification to signal to a reviewer that an item scan was recorded. A reviewer can then determine whether the item was rescanned or left on an exit conveyor belt.

Event navigation controls are used in conjunction with the event list to help an investigator navigate through video. Such controls can include controls to navigate to and from suspicious incidents within video. Dedicated buttons to navigate to the beginning and end of a video, as well as buttons to play and pause video increase a reviewer's efficiency. Buttons for such controls can become inaccessible (grayed out) when action for respective buttons is not currently available. For example, a button to pause video becomes inaccessible while a video is paused.

Event navigation controls for "Previous Incident" or "Next Incident" enable the investigator to skip directly from one suspicious transaction event (incident) to another, bypassing intermediate transaction events that are not necessarily the focus of an investigation, nor of the investigator. Such buttons can automatically highlight a selected incident within the event list, thus putting it into context of an entire transaction, as well as positioning video data to show the selected incident in viewport 150. Other types of controls, such as fast forward and rewind, are also available to be included with event navigation controls. With such controls, a transaction or any other portion of video and transaction event data can be quickly reviewed to verify the presence or absence of fraudulent activity and can facilitate duties of the investigator.

In step 450, video displayer 140, for at least one transaction event displayed in the video, visually modifies the displayed video at a moment in the displayed video when the at least one transaction event occurs in the point-of-sale transaction. At a moment in the displayed video means at a time during video playback when a transaction event occurs. For example, if the one transaction event was an item scan of milk moving across a bar code reader, then video displayer 140 visually modifies the displayed video as the point-of-sale terminal records a bar code associated with the milk. Visually modifying the displayed video includes any type of visual modification recognizable by a reviewer. Several non-limiting examples include displaying a temporary color on the video, highlighting edges of video frames, displaying a symbol such as check mark or cross, displaying text identifying the item or transaction event, or any other visual modification that represents or signals that a transaction event occurred.

In step 452, video displayer 140 overlays a visual modification on one or more frames corresponding to the moment in the displayed video when the at least one transaction event occurs, wherein a number of frames receiving a visual overlay for each transaction event is determined based on creating a visual modification of sufficient duration in displayed video to signal to a reviewer that a transaction event occurred. In other words, the modification is temporary. That is, there is a temporary modification that is subsequently removed, with no visual modification of the video data until a next transaction event.

Other forms of video overlay, such as maintaining an ever-growing list of transaction log information on the side of video, suffer from a number of limitations. For example, such a list requires that an investigator change focus from watching and scanning video to watching and reading from a list of items removed from the focus of activity in the video. This context switch is time-consuming and inefficient. Furthermore, the problem of maintaining such a list becomes difficult for large transactions, such as a grocery purchase of 150 items.

The types of information overlaid onto the video includes, but is not limited to: a visual representation of the exact moment a scan occurs, a textual description of such a scan, the number of items recorded in a multiple-item type scan, the time of any incident of interest—including, but not limited to, a faked, avoided, or otherwise missing scan. Furthermore, for scans that happen in quick succession, the video displayer 140 can alternate some distinguishing characteristic of the video overlay, such as the color of an overlaid flash, to better differentiate between the items.

Figure 13:
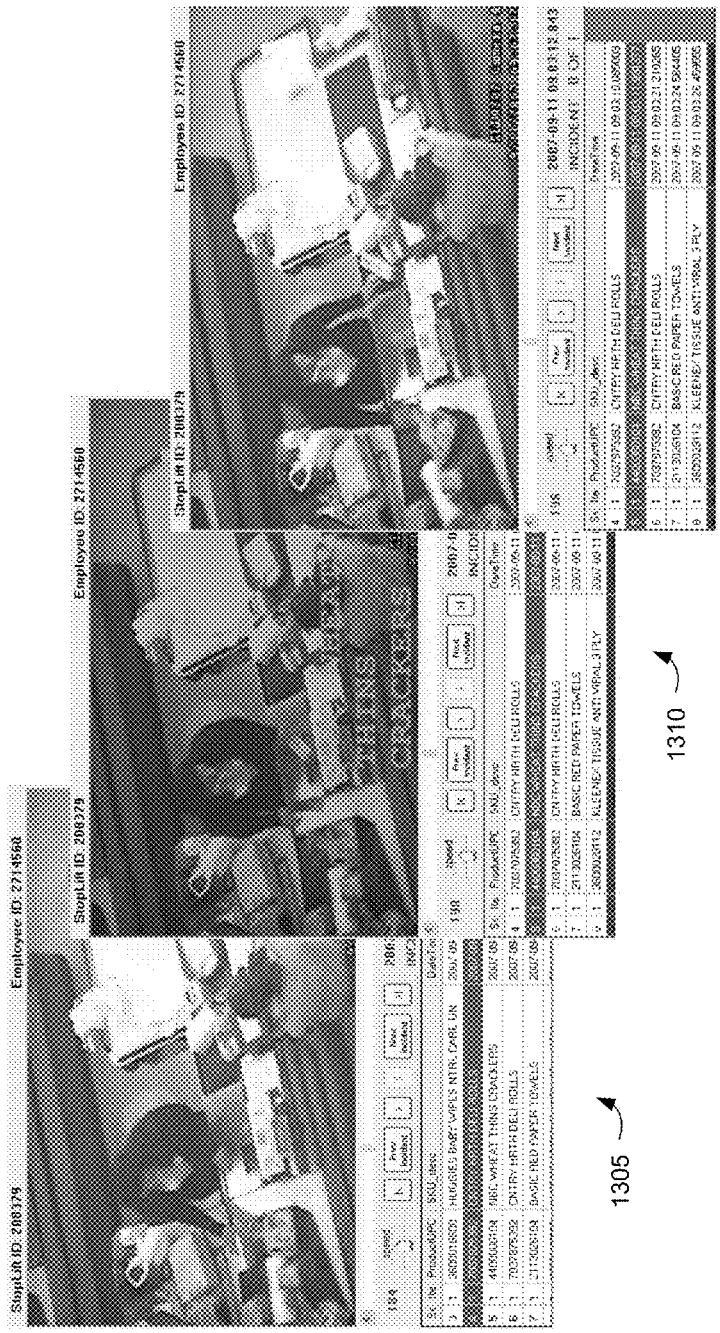
FIG. 13 is an example graphical user interface showing a visual representation of an item scan according to embodiments herein.

FIG. 13 shows an example of two types of information that can be overlaid on top of the security video, and that is pertinent to an investigator who is reviewing a legitimate scan. The two example types of information include a visual representation of the time of the scan, and a textual description of the item being scanned. The visual representation consists of highlighting the frame or frames surrounding the timestamp associated with the particular item, as given by point-of-sale data and retrieved from a synchronized transactional information. The textual description of the item is likewise retrieved from transaction log data and is overlaid on the video as a text field. Video 1305 depicts a cashier grabbing an item 307 from a conveyor belt in area 302-1. Video 1310 depicts item 307 crossing a bar code scanner. Video displayer 140 modifies video 1310 by overlaying a partially green color on the video display, and by overlaying a text box identifying the item 307 being scanned. By momentarily changing a shade of the screen to green, this visual modification signals to a reviewer that a transaction event occurred. Likewise, the momentary display of textual information provides similar functionality. In video 1315, item 307 is moved to conveyor belt area 302-3, and video displayer 140 removes the green color overlay and textual overlay. The number of video frames modified depends on the frame rate of video data. For example, video displaying 15 frames per second may need fewer frames modified than video displaying 32 frames per second.

Such video overlays can be specific to each type of event in the event list, thereby reducing the need for the investigator to switch between looking at the event list 155 and looking at the viewport 150 to keep track of various interesting events within displayed video. This provides tight integration between the viewport 150 and the event list 155, and between video displayer 140 and a user.

In step 453, video displayer 140 overlays a partially transparent color on the one or more frames. Overlaying color is a method to indicate a transaction event time without requiring a context switch. The partially transparent color can cover all or just a portion of the one or more frames. In a color rendering drawings in FIG. 13, for video 1310 there is a green hue visible in viewport 150.

In step 454, video displayer 140 alternates a color selection between successive transaction events receiving the visual overlay. For example, for a first item scanned the video displayer 140 overlays a green color, and for a subsequent scan the video displayer 140 overlays a blue color. This pattern can continue with any number of colors.

In step 455, video displayer 140 overlays a textual identification of the at least one transaction event on the one or more frames. By way of a non-limiting example, video 1310 in FIG. 13 shows the textual identification "NBC WHEAT THINS CRACKERS" over the frame.

In step 456, video displayer 140 flashes a visual change in the displayed video. In other words, the visual modification is a sudden and temporary change in the video. For example the video briefly changes an overall color, and then returns to a state before the flashed visual change. In another example, a textual identification is briefly displayed and then removed. Thus, a visual flash can be used to indicate to a reviewer what was scanned and what was not scanned. That is, a flash indicates a scan, and lack of a flash indicates absence of a scan. Alternatively, a flash indicates absence of a scan.

In step 457, video displayer 140, for transaction events identified by the object recognition logic, visually modifies the displayed video at a moment in the displayed video when the transaction events, identified by the object recognition logic, occur in the point-of-sale transaction. For transaction events recorded through the point-of-sale transaction terminal, video displayer 140 visually modifies the displayed video at a moment in the displayed video when the transaction events, recorded through the point-of-sale transaction terminal, occur in the point-of-sale transaction. In other words, video displayer 140 modifies displayed video for transaction events that are either identified by object recognition logic, or recorded through a point-of-sale terminal, or both.

In an alternative embodiment, video displayer 140 requires simultaneous identification of events for video modification. Transaction events that are both identified through graphical analysis and recorded through a point-of-sale terminal can be considered legitimate transactions. Transactions without a corresponding data from the point-of-sale terminal may be suspicious.

By modifying video for such legitimate transactions, and not modifying for unrecorded transactions, the process of reviewing video data is more efficient. For example, in one scenario a cashier swipes an item 307 across a bar code scanner, but there is no recorded scan, then the cashier rescans the same item 307 which is then read by the bar code scanner. In such a scenario, video replay shows unmodified video for the scan attempt, and then a modification to the video during the recorded scan. A reviewer watching such a video clip is able to easily see that there is no fraudulent activity because the cashier rescanned the same item. In a separate scenario, however, if the item in the unrecorded scan attempt was then placed in area 302-3 of scanned items, then this may suggest a loss. Such a loss can be verified by an investigator reviewing video data and observing an absence of video modification for the particular item.

In step 458, video displayer 140 displays video of a portion of the point-of-sale transaction, the portion being less than video of a complete duration of the point-of-sale transaction, wherein the portion includes at least one transaction event identified as potentially suspicious activity. In other words, video displayer 140 shows a video clip short enough to show potentially suspicious activity, and optionally one or more subsequent or preceding transaction events. This means that an investigator can determine whether an entire transaction is fraudulent by viewing only a portion of the transaction. This cost-saving advantage is readily observed when transactions include dozens of items or last several minutes. In a retail establishment with hundreds, thousands, or more, transactions daily, reviewing only relevant portions of potentially suspicious transactions results in a huge cost and time savings.

In step 459, video displayer 140, upon displaying video of the portion of the point-of-sale transaction, receives an indication of whether the at least one point-of-sale transaction event is suspicious. For example, an investigator reviews displayed video and marks or annotates a transaction event from a navigation control panel.

Video displayer 140 enables several types of annotation. Events associated with a particular piece of video, such as those associated with a particular transaction, contain forms of data, such as scan times and payment/tender times, that are associated with the transaction by the point-of-sale system or terminal. The event list 155 can also contain other forms of transaction events, such as those indicating fraudulent activity as marked by an automated vision system or through the review process itself. Such events or notes can be attached to the body of data associated with a transaction, through an external process such as an automated vision system. These notes can also be added through the use of the reviewer itself. Such events and notes can take many forms, or types, including but not limited to "bookmarks" added by an investigator, to mark a point in the video/transaction log timeline to refer back to at a later time, or during the course of an investigation, or to use as evidence. Other annotations can confirm fraudulent activity or a loss. User-annotated events can also be used to delineate a period of interest, indicated by a "start" event and an "end" event that are linked together by the video displayer 140.

In another embodiment, video displayer 140, for at least one transaction event displayed in the video, executes an audio signal at the moment in the displayed video when the transaction event occurs in the point-of-sale transaction. Such an audio signal could be a beep, an alarm, or spoken description identifying a currently displayed transaction event, or an absence of an item scan.

Figure 7:
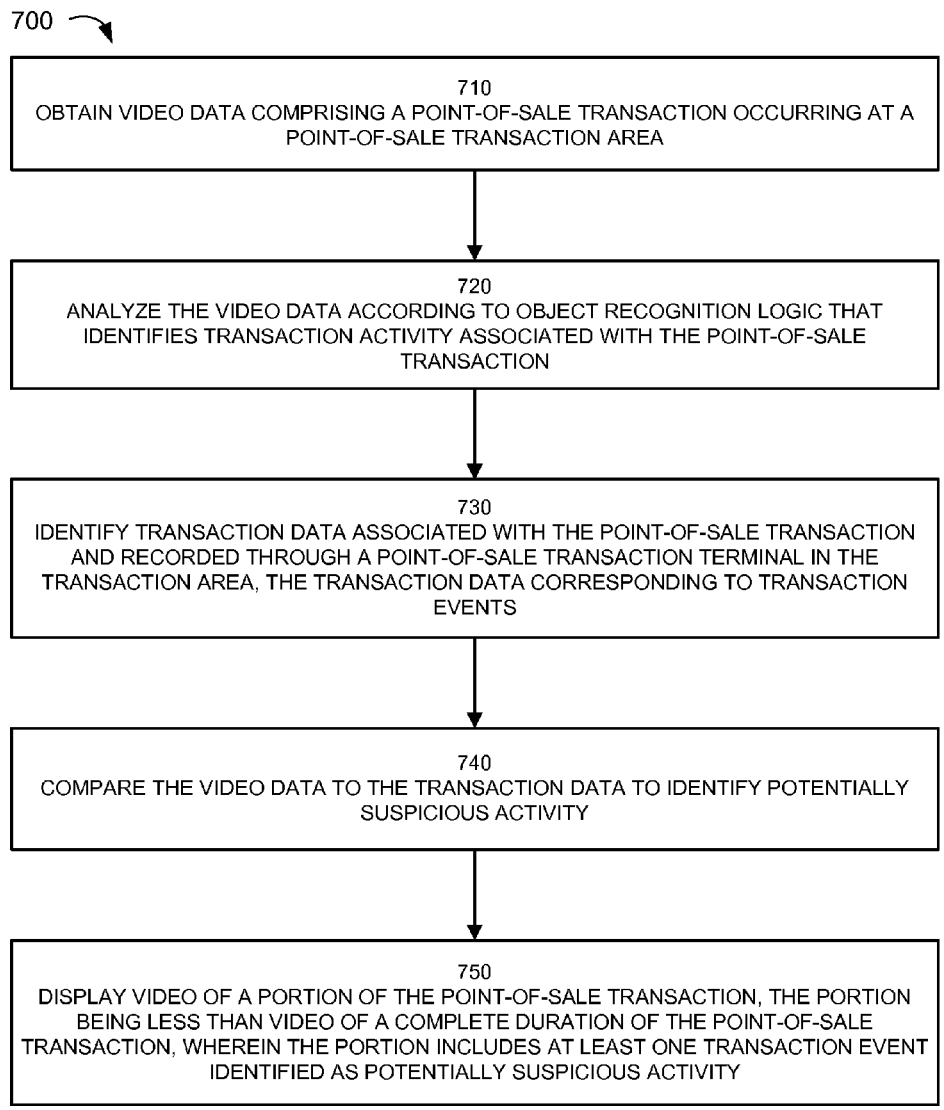

FIG. 7 is an example flowchart 700 illustrating operations associated with video displayer 140 according to embodiments herein.

In step 710, video displayer 140 obtains video data 320 comprising a point-of-sale transaction occurring at a point-of-sale transaction area 301.

In step 720, video displayer 140 analyzes the video data 320 according to object recognition logic that identifies transaction activity associated with the point-of-sale transaction. As discussed previously, the object recognition logic can use any graphical analysis process, including frame-by-frame movement analysis to identify and classify activity from the video data 320.

In step 730, video displayer 140 identifies transaction data 330 associated with the point-of-sale transaction and recorded through a point-of-sale transaction terminal 344 in the transaction area 301. Transaction data 330 corresponds to transaction events.

In step 740, the video displayer 140 compares the video data 320 to the transaction data 330 to identify potentially suspicious activity. In other words, the video displayer 140 compares each transaction event identified by the video and analysis process to a synchronized transaction log at a corresponding time to identify inconsistent activity. For example, in one scenario the object recognition logic identifies movement of item 307 across a barcode scanner, but a comparison of this activity to transaction data 330 reveals no recorded scan. In another example scenario, recorded transaction data 330 records a single scan while the object recognition logic identifies multiple items 307 crossing a scanner simultaneously. In another example scenario, transaction data 330 identifies an item scan while analysis of the video data 320 shows no item activity or movement at a corresponding time. These are just a few examples of how video displayer 140 can identify potentially suspicious activity from the comparison of video data 320 and transaction data 330.

In step 750, video displayer 140 displays video of a portion of the point-of-sale transaction, the portion being less than video of a complete duration of the point-of-sale transaction. The portion includes at least one transaction event identified as potentially suspicious activity.

Figure 8:
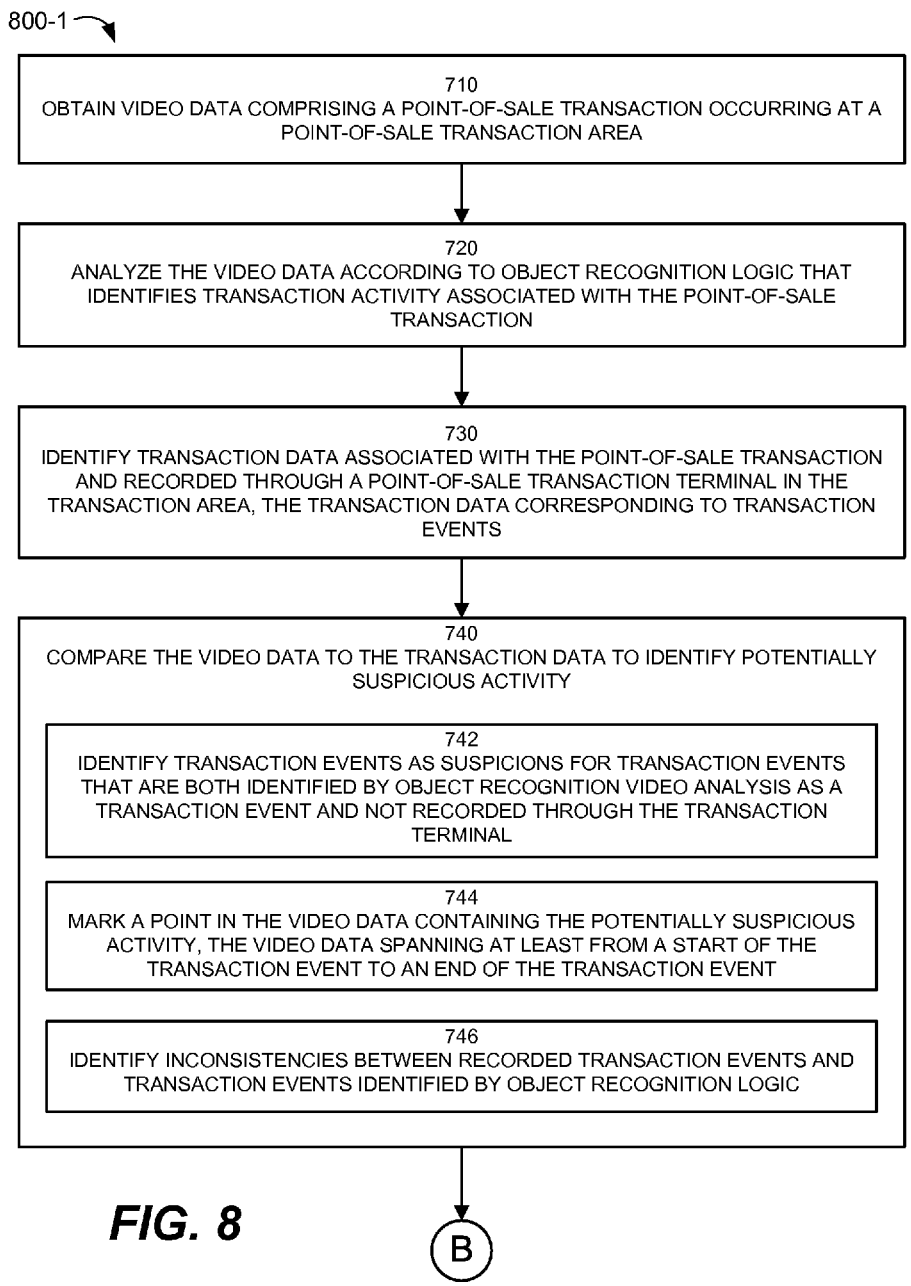
Figure 9:
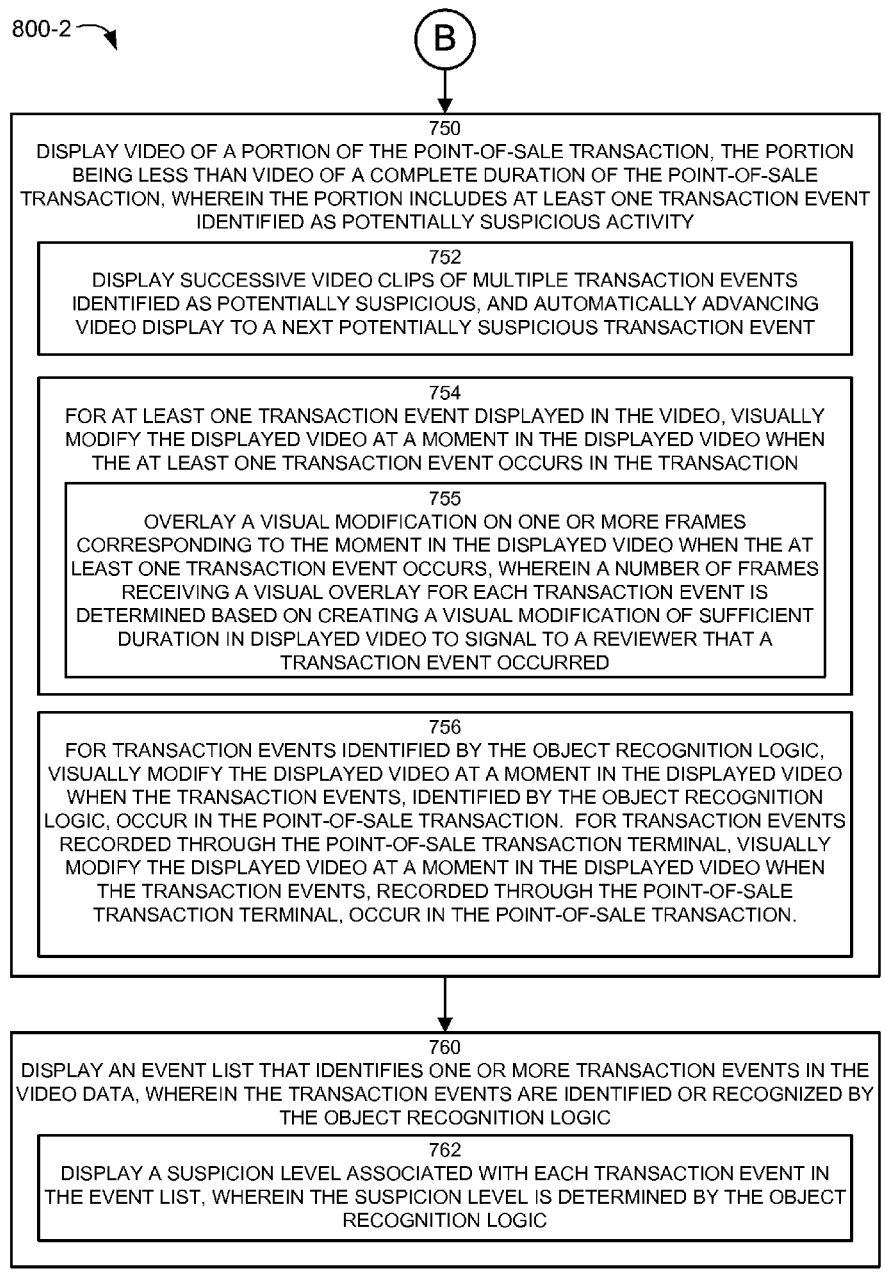

FIG. 8 is an example flowchart 800 illustrating operations associated with video displayer 140 according to embodiments herein.

In step 710, video displayer 140 obtains video data 320 comprising a point-of-sale transaction occurring at a point-of-sale transaction area 301.

In step 720, video displayer 140 analyzes the video data 320 according to object recognition logic that identifies transaction activity associated with the point-of-sale transaction.

In step 730, video displayer 140 identifies transaction data 330 associated with the point-of-sale transaction and recorded through a point-of-sale transaction terminal 344 in the transaction area 301. Transaction data 330 corresponds to transaction events.

In step 740, the video displayer 140 compares the video data 320 to the transaction data 330 to identify potentially suspicious activity. In step 742, video displayer 140 identifies transaction events as suspicious for transaction events that are both identified by object recognition video analysis as a transaction event and not recorded through the transaction terminal. In one example, an object recognition analysis determines that a transaction event occurred, such as an item moving across a barcode scanner, while there is no corresponding transaction events recorded through point-of-sale terminal 344.

In step 744, video displayer 140 marks a point in the video data 320 containing the potentially suspicious activity, the video data 320 spanning at least from a start of the transaction event to an end of the transaction event. Such marking is useful for adding information to an event list, and for instantaneous playback of suspicious activity.

In step 746, video displayer 140 identifies inconsistencies between recorded transaction events and transaction events identified by object recognition logic. This step is useful for automated identification of potentially suspicious activity. Inconsistencies can be identified by rules associated with point-of-sale transactions, and can be tailored to a specific retail establishment's point-of-sale conventions.

In step 750, video displayer 140 displays video of a portion of the point-of-sale transaction, the portion being less than video of a complete duration of the point-of-sale transaction, wherein the portion includes at least one transaction event identified as potentially suspicious activity.

In step 752, video displayer 140 displays successive video clips of multiple transaction events identified as potentially suspicious, and automatically advances video display to a next potentially suspicious transaction event. Displaying successive video clips of potentially suspicious activity increases efficiency of an investigator to identify whether there is an associated loss.

In step 754, video displayer 140, for at least one transaction event displayed in the video, visually modifies the displayed video at a moment in the displayed video when the at least one transaction event occurs in the transaction. As discussed above, briefly modifying video at a moment when a transaction event occurs signals a transaction to a user without requiring a context switch.

In step 755, video displayer 140 overlays a visual modification on one or more frames corresponding to the moment in the displayed video when the at least one transaction event occurs, wherein a number of frames receiving a visual overlay for each transaction event is determined based on creating a visual modification of sufficient duration in displayed video to signal to a reviewer that a transaction event occurred. The video modification is transient, but the video displayer 140 modifies a sufficient number of frames that a video reviewer can recognize the modification.

In step 756, video displayer 140, for transaction events identified by the object recognition logic, visually modifies the displayed video at a moment in the displayed video when the transaction events, identified by the object recognition logic, occur in the point-of-sale transaction. For transaction events recorded through the point-of-sale transaction terminal, video displayer 140 visually modifies the displayed video at a moment in the displayed video when the transaction events, recorded through the point-of-sale transaction terminal, occur in the point-of-sale transaction.

Alternatively, for recorded point-of-sale transaction events that are both identified by the object recognition logic and recorded through the point-of sale transaction system 344, video displayer 140 visually modifies the displayed video at a moment in the displayed video when the recorded point-of-sale transaction events occur in the point-of-sale transaction.

In step 760, video displayer 140 displays an event list that identifies one or more transaction events in the video data 320, wherein the transaction events are identified or recognized by the object recognition logic. In step 762, video displayer 140 display a suspicion level associated with each transaction event in the event list, wherein the suspicion level is determined by the object recognition logic. Video displayer 140 uses rules in comparing data sources to identify probabilities of suspicious activity. With such probabilities, video displayer 140 can identify a level of severity of potentially suspicious activity. This is useful to help an investigator prioritize time spent reviewing potentially suspicious activity.

There are many ways in which video displayer 140 is capable of communicating notifications of transaction events to the investigator, such as with heads-up display video overlays, through the use of color coding events in the event list 155, and through the automatic selection/timeline capability of the event list 155 described previously. Other methods of communicating to the user that a transaction event is occurring or is about to occur include audio beeps, spoken textual descriptions of the transaction event, and even tactile feedback.

Figure 10:
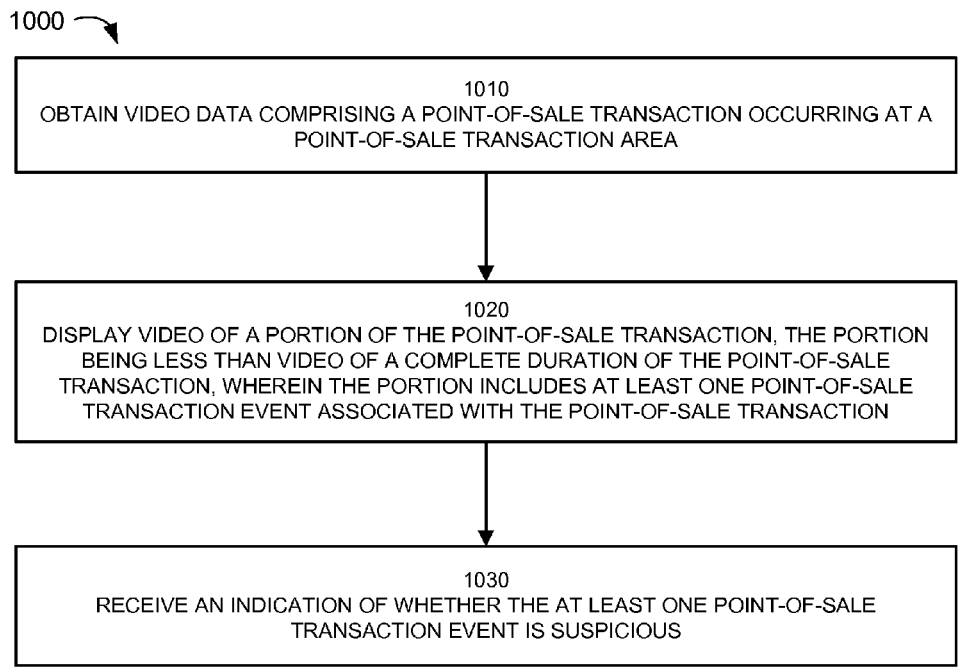
Figure 12:
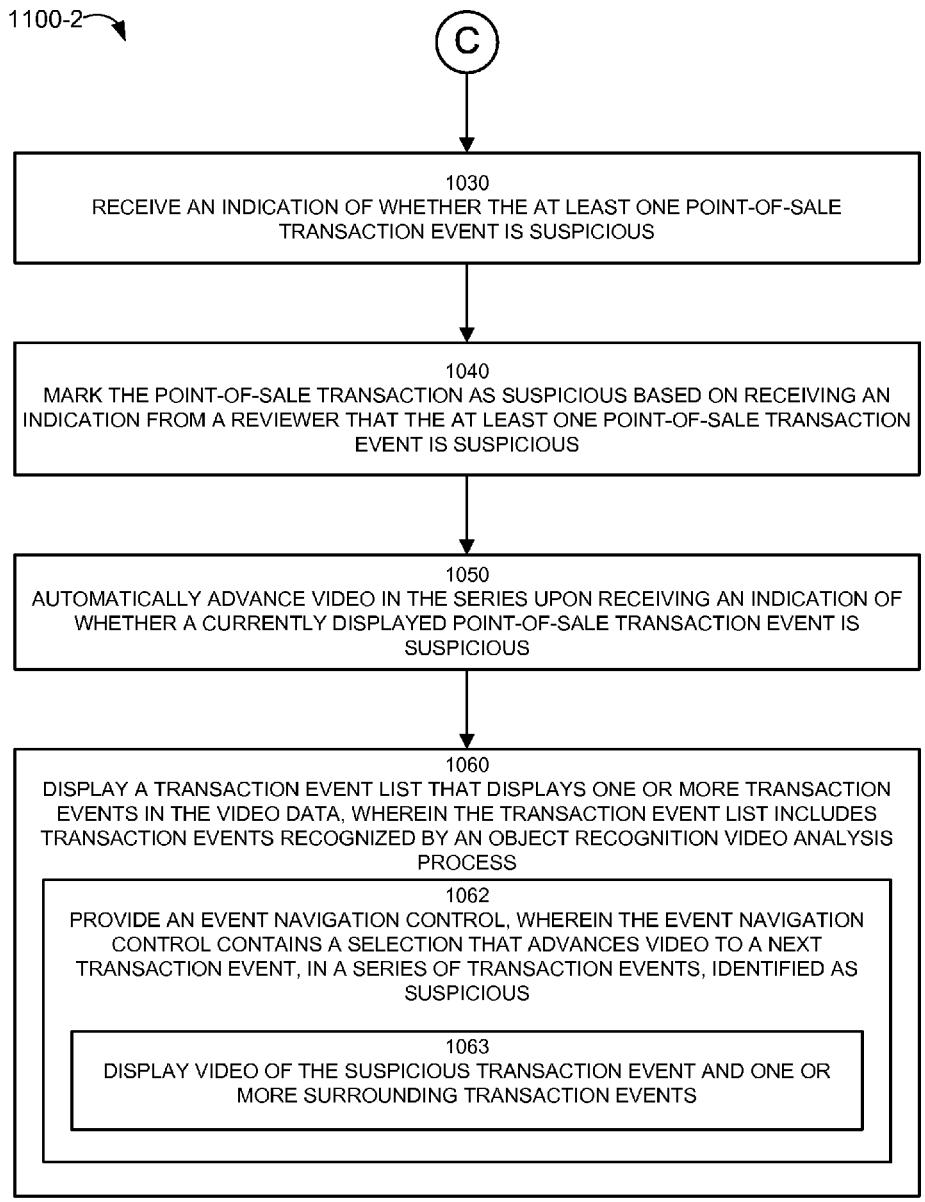

FIG. 10 is an example flowchart 1000 illustrating operations associated with video displayer 140 according to embodiments herein.

In step 1010, video displayer 140 obtains video data 320 comprising a point-of-sale transaction occurring at a point-of-sale transaction area 301.

In step 1020, video displayer 140 displays video of a portion of the point-of-sale transaction, the portion being less than video of a complete duration of the point-of-sale transaction, wherein the portion includes at least one point-of-sale transaction event associated with the point-of-sale transaction. In other words, video displayer 140 displays a video clip of just part of an entire point-of-sale transaction.

In step 1030, video displayer 140 receives an indication of whether the point-of-sale transaction event is suspicious. For example, video displayer 140 provides a graphical user interface, or other interface, for a user to indicate whether a currently displayed transaction event is potentially suspicious, or whether the transaction event results in a real loss such as to a retail establishment. This point-of-sale transaction event includes any transaction event associated with the point-of-sale transaction identified in any way.

FIG. 11 is an example flowchart 1100 illustrating operations associated with video displayer 140 according to embodiments herein.

In step 1010, video displayer 140 obtains video data 320 comprising a point-of-sale transaction occurring at a point-of-sale transaction area 301.

In step 1020, video displayer 140 displays video of a portion of the point-of-sale transaction, the portion being less than video of a complete duration of the point-of-sale transaction, wherein the portion includes at least one point-of-sale transaction event associated with the point-of-sale transaction.

In step 1022, video displayer 140 displays video comprising a series of video clips of point-of-sale transactions, wherein each video clip displayed contains a potentially suspicious transaction event. Such potentially suspicious transaction events can include sweethearting attempts were a cashier attempts to exclude items from a purchase. Other potentially suspicious transaction events can include un-scanned items due to cashier error, laziness, or negligence.

In step 1024, video displayer 140, for transaction events displayed in the video, visually modifies the displayed video at a moment in the displayed video when the transaction events occur in the transaction.

In step 1025, video displayer 140 overlays a visual modification on one or more frames corresponding to the moment in the displayed video when the at least one transaction event occurs, wherein a number of frames receiving a visual overlay for each transaction event is determined based on creating a visual modification of sufficient duration in displayed video to signal to a reviewer that a transaction event occurred.

In step 1026, video displayer 140, for point-of-sale transaction events identified by object recognition logic, visually modifies the displayed video at a moment in the displayed video when the point-of-sale transaction events, identified by the object recognition logic, occur in the point-of-sale transaction. For point-of-sale transaction events recorded through the point-of-sale transaction terminal, video displayer 140 visually modifies the displayed video at a moment in the displayed video when the point-of-sale transaction events, recorded through the point-of-sale transaction terminal, occur in the point-of-sale transaction Alternatively, for recorded point-of-sale transaction events that are both identified by the video analysis process and recorded through the point-of sale transaction system 344, video displayer 140 visually modifies the displayed video at a moment in the displayed video when the recorded point-of-sale transaction events occur in the point-of-sale transaction.

In step 1030, video displayer 140 receives an indication of whether the at least one point-of-sale transaction event is suspicious.

In step 1040, video displayer 140 marks the point-of-sale transaction as suspicious based on receiving an indication from a reviewer that the at least one point-of-sale transaction event is suspicious. For example, a user interface can provide "Yes" and "No" buttons for an investigator to indicate whether a particular transaction event is suspicious.

In step 1050, video displayer 140 automatically advances video in the series upon receiving an indication of whether a currently displayed point-of-sale transaction event is suspicious.

In step 1060, video displayer 140 displays a transaction event list 155 that displays one or more transaction events in the video data 320, wherein the transaction event list 155 includes transaction events recognized by an object recognition video analysis process.

Figure 16:
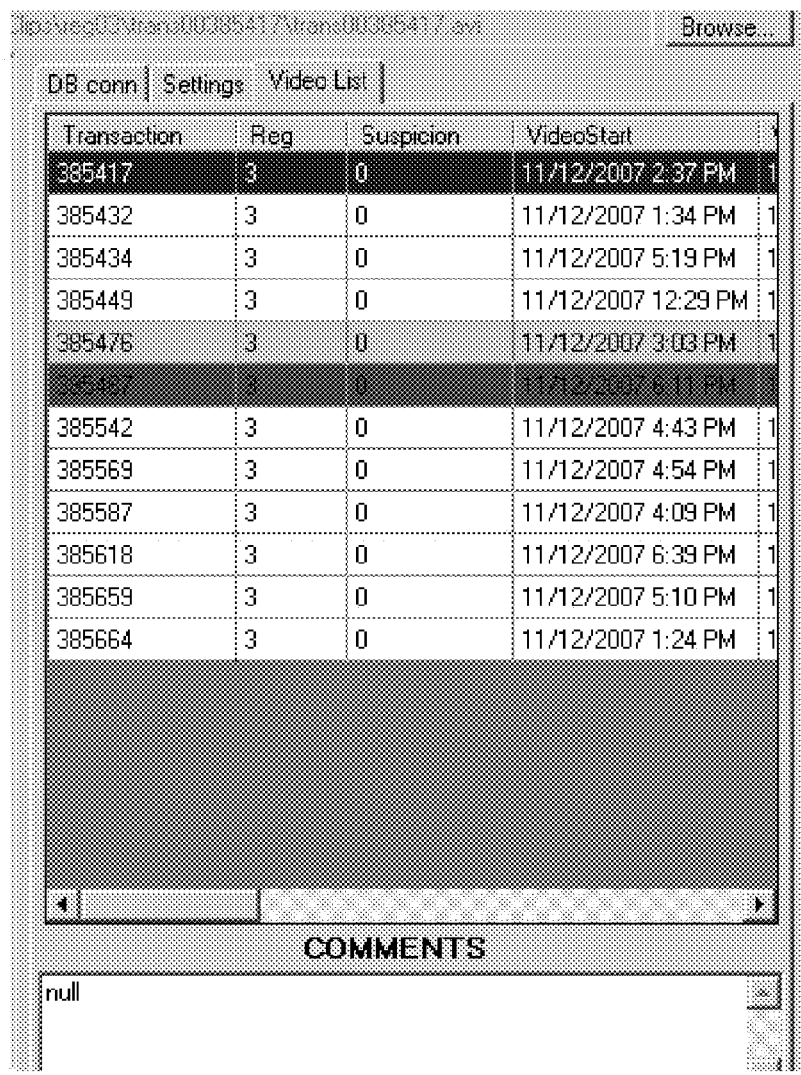
FIG. 16 is an example graphical user interface illustrating a transaction event navigation list according to embodiments herein.

The event list 155, and video displayer 140, optionally enable higher-level navigation of video and data. For example, as shown in FIG. 16, a navigation pane can be included that gives the investigator random access to video and transactions, enabling immediate access to a store's entire transactional and video history. Like the event list 155, this navigation pane list can also be color coded, to inform the investigator whether any suspicious incidents are present within the current transaction. Other, higher-level information that may prove vital to an investigation can also be included in this list, including but not limited to an assignment of suspicion level to a particular transaction, or the inclusion of cashier statistics, such as a cumulative total of the number of thefts or losses attributed to that cashier, or performance metrics.

Another interface that can be used to provide high-level navigation through a store's transaction history is through the integration of the reviewer with another application via file association links. As shown in FIG. 17, a spreadsheet application is used to organize and perform queries on a body of transaction log data. Each row of the spreadsheet corresponds to one piece of logically organized video and data, such as, but not limited to, a transaction or a portion of a transaction. Each row also has a link that can be simply clicked on to open the viewport 150 and review the transaction with full annotation, and with the option of opening the application and placing the video at the point of the first suspicious incident, thereby facilitating the investigator's duties.

In step 1062, video displayer 140 provides an event navigation control 160, wherein the event navigation control 160 contains a selection that advances video to a next transaction event, in a series of transaction events, identified as suspicious.

In step 1063, video displayer 140 displays video of the suspicious transaction event and one or more surrounding transaction events. In this way, a displayed video clip is put in context with an entire transaction, while a reviewer is still able to determine whether an entire transaction is fraudulent by reviewing only a portion of the transaction.

Returning to FIG. 2, functionality supported by computer system 110 and, more particularly, functionality associated with video displayer 140 will now be discussed.

FIG. 2 is a block diagram of an example architecture of a respective computer system 110 such as one or more computers, processes, etc., for implementing a video displayer 140 according to embodiments herein. Computer system 110 can include one or more computer devices such as personal computers, servers that make up a website, workstations, portable computing devices, consoles, network terminals, networks, processing devices, etc.

In FIG. 2, computer system 110 is shown connected to display monitor 130 for displaying a graphical user interface 133 for a user 106 to select and view documents, using input devices 116 and to view edited content. Repository 181 can optionally be used for storing documents and content both before and after processing. Input devices 116 can include one or more devices such as a keyboard, computer mouse, etc.

Note that the following discussion provides a basic embodiment indicating how to carry out functionality associated with the video displayer 140 as discussed above and below. However, it should be noted that the actual configuration for carrying out the video displayer 140 can vary depending on a respective application. For example, as previously discussed, computer system 110 can include one or multiple computers that carry out the processing as described herein.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the video displayer 140 of computer system 110 to communicate over a network and, if necessary, retrieve any data required to create views, process content, communicate with a user, etc. according to embodiments herein.

As shown, memory system 112 is encoded with video displayer application 140-1 that supports functionality as discussed above and as discussed further below. Video displayer application 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the video displayer application 140-1. Execution of the video displayer application 140-1 produces processing functionality in video displayer process 140-2. In other words, the video displayer process 140-2 represents one or more portions of the video displayer 140 performing within or upon the processor 113 in the computer system 110.

It should be noted that, in addition to the video displayer process 140-2 that carries out method operations as discussed herein, other embodiments herein include the video displayer application 140-1 itself (i.e., the un-executed or non-performing logic instructions and/or data). The video displayer application 140-1 may be stored on a tangible computer readable storage medium or any other computer readable media such as floppy disk, hard disk, optical medium, etc. According to other embodiments, the video displayer application 140-1 can also be stored in a memory type system such as in firmware, read only memory (ROM), or, as in this example, as executable code within the memory system 1012.

In addition to these embodiments, it should also be noted that other embodiments herein include the execution of the video displayer application 140-1 in processor 113 as the video displayer process 140-2. Thus, those skilled in the art will understand that the computer system 110 can include other processes and/or software and hardware components, such as an operating system that controls allocation and use of hardware resources, or multiple processors.

Such a system is capable of being used both to review archival footage from some earlier time as well as being used in a synchronous, real-time setting to view video overlaid with transactional information as it is occurring. When used in a real-time scenario to view video of transaction events as they unfold, the event list 155 is automatically appended with the latest transaction events. As transaction events, such as scans or cash drawer openings, occur, they are shown as heads-up display overlays within the viewport 150, in the manner suitable to the type of event, and are also added to the event list 155. In this way video displayer 140 maintains a history and each event can be contextualized by the investigator. Furthermore, such events are immediately accessible and can be retrieved and reviewed during real-time operation.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A computer-implemented method in which a computer system performs operations comprising:
   obtaining video data comprising a point-of-sale transaction occurring at a point-of-sale transaction area, the video data including transaction events;
   obtaining transaction data concerning the point-of-sale transaction occurring at the point-of-sale transaction area, the transaction data corresponding to transaction events recorded through a point-of-sale transaction terminal;
   displaying video, from the video data, containing transaction events, the displayed video including video of at least a portion of the point-of-sale transaction, the portion being less than video of a complete duration of the point-of-sale transaction, the portion including at least one transaction event identified as potentially suspicious activity and at least one transaction event identified as not potentially suspicious; and
   visually modifying the displayed video such that when displaying the portion of the point-of-sale transaction, a visual modification to the displayed video is displayed at a moment in the displayed video when the at least one transaction event identified as not potentially suspicious activity occurs.

2. The method of claim 1, wherein visually modifying the displayed video further comprises:
   overlaying a visual modification on one or more frames corresponding to the moment in the displayed video when the at least one transaction event occurs.

3. The method of claim 2, wherein overlaying the visual modification further comprises:
   overlaying a partially transparent color on the one or more frames.

4. The method of claim 3, wherein overlaying the partially transparent color further comprises:
   alternating a color selection between successive transaction events receiving the visual overlay.

5. The method of claim 2, wherein overlaying the visual modification further comprises:
   overlaying a textual identification of the at least one transaction event on the one or more frames.

6. The method of claim 1, wherein visually modifying the displayed video further comprises:
   flashing a visual change in the displayed video.

7. The method of claim 1, further comprising:
   analyzing the video data according to object recognition logic that recognizes activity of items associated with the point-of-sale transaction and identifies transaction events;
   for transaction events identified by the object recognition logic, visually modifying the displayed video at a moment in the displayed video when the transaction events, identified by the object recognition logic, occur in the point-of-sale transaction; and
   for transaction events recorded through the point-of-sale transaction terminal, visually modifying the displayed video at a moment in the displayed video when the transaction events, recorded through the point-of-sale transaction terminal, occur in the point-of-sale transaction.

8. The method of claim 7 further comprising:
   displaying an event list that displays transaction events in the video data, wherein the event list includes transaction events identified through the video analysis process, and transaction events recorded through the point-of-sale transaction terminal;
   receiving a selection of a transaction event displayed in the event list; and
   displaying video associated with the selected transaction event.

9. The method of claim 1, wherein displaying video further comprises:
   displaying video of a portion of the point-of-sale transaction that includes the at least one transaction event identified as potentially suspicious activity.

10. The method of claim 9, further comprising:
upon displaying video of the portion of the point-of-sale transaction that includes the at least one transaction event identified as potentially suspicious activity, receiving an indication of whether the at least one point-of-sale transaction event is suspicious.

11. The method of claim 1, further comprising:
providing an event navigation control, wherein the event navigation control contains an interface for receiving a selection that advances displayed video to a next transaction event, in a series of transaction events, identified as suspicious, wherein displaying video of the next transaction event identified as suspicious, comprises displaying video including the suspicious transaction event and at least one additional transaction event.

12. The method of claim 1, further comprising:
for the at least one transaction event displayed in the video, executing an audio signal at the moment in the displayed video when the at least one transaction event occurs in the point-of-sale transaction.

13. The method of claim 1 further comprising:
comparing the video data to the transaction data to identify potentially suspicious activity associated with a transaction event that occurred during the point-of-sale transaction.

14. The method of claim 13, wherein comparing the video data to the transaction data to identify potentially suspicious activity further comprises:
identifying transaction events as suspicious for transaction events that are both identified by object recognition video analysis as a transaction event and not recorded through the transaction terminal.

15. The method of claim 13, wherein comparing the video data to the transaction data to identify potentially suspicious activity further comprises:
marking a point in the video data containing the potentially suspicious activity, the video data spanning at least from a start of the transaction event to an end of the transaction event.

16. The method of claim 13, wherein comparing the video data to the transaction data to identify potentially suspicious activity further comprises:
identifying inconsistencies between recorded transaction events and transaction events identified by object recognition logic; and
wherein displaying video from the video data further comprises:
displaying successive video clips of multiple transaction events identified as potentially suspicious, and automatically advancing the displayed video to a next potentially suspicious transaction event.

17. The method of claim 1 further comprising:
displaying an event list that identifies one or more transaction events in the video data, wherein the transaction events listed in the event list are identified or recognized by object recognition logic.

18. The method of claim 17, wherein displaying an event list further comprises:
displaying one or more suspicion levels associated with one or more transaction events identified in the event list, wherein a suspicion level associated with a transaction event identified in the event list is determined by the object recognition logic.

19. A computer-implemented method in which a computer system performs operations comprising:
obtaining video data comprising a point-of-sale transaction occurring at a point-of-sale transaction area;
displaying video, from the obtained video data, of a portion of the point-of-sale transaction, the portion being less than video of a complete duration of the point-of-sale transaction, the portion including at least one point-of-sale transaction event associated with the point-of-sale transactions
displaying information associated with the point-of-sale transaction event, the information associated with the point-of-sale event being displayed as an overlay over the displayed video of the portion of the point-of-sale transaction;
receiving an indication of whether the at least one point-of-sale transaction event is suspicious via a user interface in response to displaying video of the portion of the point-of-sale transaction;
marking the point-of-sale transaction as suspicious based on receiving the indication;
modifying the video data such that when displaying video containing transaction events of the portion of the point-of-sale transaction, a visual modification to the video data is displayed at a moment in the displayed video when transaction events identified as not potentially suspicious activity occur, transaction events recorded through a point-of-sale transaction terminal being identified as not potentially suspicious activity; and
displaying at least one video clip of at least one point-of-sale transaction, the at least one video clip displayed containing a potentially suspicious transaction event, at least a portion of potentially suspicious transaction events being identified as potentially suspicious based on an analysis process identifying item presence at a point-of-sale terminal but without identifying corresponding point-of-sale data recorded via the point-of-sale terminal.

20. The method of claim 19, wherein the indication is received from a reviewer, and wherein the method further comprises:
marking the point-of-sale transaction as suspicious based on receiving the indication from the reviewer that the at least one point-of-sale transaction event is suspicious.

21. The method of claim 19 further comprising:
displaying video comprising a series of video clips of point-of-sale transactions, wherein each video clip displayed contains a potentially suspicious transaction event; and
automatically advancing video in the series upon receiving an indication of whether a currently displayed point-of-sale transaction event is suspicious.

22. The method of claim 19 further comprising:
displaying a transaction event list that displays one or more transaction events in the video data, wherein the transaction event list includes transaction events recognized by an object recognition video analysis process, wherein displaying the transaction event list includes providing an event navigation control, wherein the event navigation control contains a selection that advances video to a next transaction event, in a series of transaction events, identified as suspicious.

23. The method of claim 22, further comprising:
receiving an indication that the selection to advance to the video to the next transaction event identified as suspicious has been selected; and
in response to receiving the indication that the selection has been selected:
displaying video of the next transaction event identified as suspicious, and displaying video of one or more transaction events surrounding the next transaction event.

24. The method of claim 19 further comprising:
for transaction events displayed in the video, visually modifying the displayed video at a moment in the displayed video when the transaction events occur in the transaction.

25. The method of claim 24, wherein visually modifying the displayed video further comprises:
overlaying a visual modification on one or more frames corresponding to the moment in the displayed video when the at least one transaction event occurs, wherein a number of frames receiving a visual overlay for each transaction event is determined based on creating a visual modification of sufficient duration in displayed video to signal to a reviewer that a transaction event occurred.

26. The method of claim 25 further comprising:
for point-of-sale transaction events identified by object recognition logic, visually modifying the displayed video at a moment in the displayed video when the point-of-sale transaction events, identified by the object recognition logic, occur in the point-of-sale transaction; and
for point-of-sale transaction events recorded through the point-of-sale transaction terminal, visually modifying the displayed video at a moment in the displayed video when the point-of-sale transaction events, recorded through the point-of-sale transaction terminal, occur in the point-of-sale transaction.

27. The method of claim 1, further comprising:
analyzing the video data according to object recognition logic that recognizes activity of items associated with the point-of-sale transaction;
wherein the at least one transaction event identified as potentially suspicious activity is identified as a transaction event recognized by the object recognition logic but not recorded by the point-of-sale transaction terminal as a transaction event; and
wherein the at least one transaction event identified as not potentially suspicious activity is identified as being recorded by the point-of-sale transaction terminal as a transaction event.

28. The method of claim 1, further comprising:
modifying the video data such that when displaying video of the point-of-sale transaction, a visual modification to the video data is displayed at a moment in the displayed video when at least one transaction event that is net identified as potentially suspicious activity occurs.

29. The method of claim 28, wherein modifying the video data further comprises:
overlaying a modification on one or more frames as the visual modification.

30. The method of claim 1, further comprising:
correlating the video data with the transaction data.

31. The method of claim 13, further comprising:
analyzing the video data according to object recognition logic that identifies transaction activity associated with the point-of-sale transaction,
wherein comparing the video data to the transaction data further comprises:
comparing the identified transaction activity to the transaction data to identify potentially suspicious activity.

32. The method of claim 1, wherein the displayed video:
includes video from video data that is associated with a first portion of the point-of-sale transaction, and
excludes video from video data that is associated with a second portion of the point-of-sale transaction, and
wherein the video data associated with the first portion of the point-of-sale transaction includes video data associated with the transaction event.

33. The method of claim 1, wherein displaying video from the video data further comprises:
displaying video from video data that is associated with a first portion of the point-of-sale transaction, the first portion being less video data than video data associated with a complete duration of the point-of-sale transaction; and
excluding from the displayed video, video from video data that is associated with a second portion of the point-of-sale transaction.

34. A tangible non-transitory computer-readable medium comprising computer-executable instructions for:
obtaining video data comprising a point-of-sale transaction occurring at a point-of-sale transaction area, the video data including transaction events;
obtaining transaction data concerning the point-of-sale transaction occurring at the point-of-sale transaction area, the transaction data corresponding to transaction events recorded through a point-of-sale transaction terminal;
displaying video, from the video data, containing transaction events, the displayed video including video of at least a portion of the point-of-sale transaction, the portion being less than video of a complete duration of the point-of-sale transaction, the portion including at least one transaction event identified as potentially suspicious activity and at least one transaction event identified as not potentially suspicious; and
visually modifying the displayed video such that when displaying the portion of the point-of-sale transaction, a visual modification to the displayed video is displayed at a moment in the displayed video when the at least one transaction event identified as not potentially suspicious activity occurs.

* * * * *